United States Patent [19]
Kastner

[11] Patent Number: 5,949,197
[45] Date of Patent: Sep. 7, 1999

[54] APPARATUS AND METHOD FOR DIMMING A GAS DISCHARGE LAMP

[75] Inventor: Mark Kastner, New Berlin, Wis.

[73] Assignee: Everbrite, Inc., Greenfield, Wis.

[21] Appl. No.: 08/885,438

[22] Filed: Jun. 30, 1997

[51] Int. Cl.⁶ ................................................. G05F 1/00
[52] U.S. Cl. .......................... 315/291; 315/362; 315/307; 315/DIG. 4; 361/42
[58] Field of Search ................................. 315/219, 291, 315/307, 224, 362, 209 R, DIG. 2, DIG. 4, DIG. 5; 361/42, 45, 46

[56] References Cited

U.S. PATENT DOCUMENTS

| | | | |
|---|---|---|---|
| 3,683,923 | 8/1972 | Anderson | 128/303.14 |
| 3,708,721 | 1/1973 | Marcade et al. | 317/18 B |
| 3,746,929 | 7/1973 | Kotheimer | 317/18 A |
| 3,868,546 | 2/1975 | Gilbreath et al. | 315/293 |
| 3,936,696 | 2/1976 | Gray | 315/210 |
| 3,961,319 | 6/1976 | Asberry | 340/255 |
| 4,115,829 | 9/1978 | Howell | 361/42 |
| 4,170,747 | 10/1979 | Holmes | 315/307 |
| 4,220,895 | 9/1980 | Nuver | 315/195 |
| 4,251,752 | 2/1981 | Stolz | 315/206 |
| 4,415,839 | 11/1983 | Lesea | 315/308 |
| 4,464,606 | 8/1984 | Kane | 315/158 |
| 4,507,698 | 3/1985 | Nilssen | 361/42 |
| 4,523,131 | 6/1985 | Zansky | 315/307 |
| 4,542,432 | 9/1985 | Nichols, III et al. | 361/44 |
| 4,553,070 | 11/1985 | Sairanen et al. | 315/209 R |
| 4,563,719 | 1/1986 | Nilssen | 361/45 |
| 4,595,919 | 6/1986 | Holz et al. | 340/793 |
| 4,663,571 | 5/1987 | Nilssen | 315/244 |
| 4,855,860 | 8/1989 | Nilssen | 361/45 |
| 4,862,039 | 8/1989 | Kile et al. | 315/194 |
| 4,870,326 | 9/1989 | Andresen et al. | 315/200 R |
| 4,904,906 | 2/1990 | Atherton et al. | 315/291 |
| 4,916,362 | 4/1990 | Orenstein | 315/219 |
| 4,931,893 | 6/1990 | Glennon et al. | 361/45 |
| 4,933,605 | 6/1990 | Quazi et al. | 315/224 |
| 4,991,105 | 2/1991 | Pimental | 364/483 |
| 4,998,046 | 3/1991 | Lester | 315/209 R |
| 5,001,386 | 3/1991 | Sullivan et al. | 315/219 |
| 5,023,518 | 6/1991 | Mans et al. | 315/219 |
| 5,041,763 | 8/1991 | Sullivan et al. | 315/176 |
| 5,041,767 | 8/1991 | Doroftei et al. | 315/292 |
| 5,045,758 | 9/1991 | Hildebrand | 315/151 |
| 5,099,212 | 3/1992 | Nagaishi | 324/508 |
| 5,103,138 | 4/1992 | Orenstein et al. | 315/209 R |

(List continued on next page.)

FOREIGN PATENT DOCUMENTS

| | | |
|---|---|---|
| 0 596 740 | 5/1994 | European Pat. Off. . |
| 2 075199 | 3/1990 | Japan . |
| 4 028199 | 1/1992 | Japan . |
| 4 351889 | 12/1992 | Japan . |
| 2 306 062 | 4/1997 | United Kingdom . |
| WO 92 04809 | 3/1992 | WIPO . |

OTHER PUBLICATIONS

SGS–Thomson Microelectronics, *Discrete Power Semiconductor Handbook*, 1st Edition, 1995, pp. 369–377.

*Primary Examiner*—Haissa Philogene
*Attorney, Agent, or Firm*—Michael Best & Friedrich LLP

[57] ABSTRACT

A power supply for a gas discharge lamp includes a converter, a microprocessor switch control circuit, a driver, a switching network having two MOSFET switches, and an output transformer. A cross conduct inhibit circuit is connected in series between the driver and the switching network to prevent simultaneous operation of the switches. The power supply may further include a ground fault interrupt circuit and a ground continuity detector. A dimming module contains a potentiometer input device to vary the brightness of the lamp. The power supply operates at a preset level until the dimming module is connected. The dimming module cannot be removed without shutting off the power supply. The first and second MOSFETs switch first and second voltages across the transformer, thereby causing first and second drive pulses in the periodic output signal. Between the first and second and the second and first drive pulses are first and second dead times. The power supply sets the brightness level of the lamp by varying at least one of the dead time periods.

113 Claims, 17 Drawing Sheets

U.S. PATENT DOCUMENTS

| | | | |
|---|---|---|---|
| 5,103,139 | 4/1992 | Nilssen | 315/219 |
| 5,128,592 | 7/1992 | Dean et al. | 315/224 |
| 5,173,643 | 12/1992 | Sullivan | 315/276 |
| 5,191,318 | 3/1993 | Glennon | 340/635 |
| 5,231,333 | 7/1993 | Orenstein | 315/219 |
| 5,243,261 | 9/1993 | Bergervoet et al. | 315/248 |
| 5,323,090 | 6/1994 | Lestician | 315/291 |
| 5,349,273 | 9/1994 | Pacholok | 315/307 |
| 5,353,214 | 10/1994 | Kim | 363/56 |
| 5,365,148 | 11/1994 | Mallon et al. | 315/194 |
| 5,367,224 | 11/1994 | Pacholok | 315/219 |
| 5,367,225 | 11/1994 | Pacholok et al. | 315/219 |
| 5,396,155 | 3/1995 | Bezdon et al. | 315/291 |
| 5,422,546 | 6/1995 | Nilssen | 315/219 |
| 5,424,618 | 6/1995 | Bertenshaw et al. | 315/324 |
| 5,424,893 | 6/1995 | Francis, Jr. et al. | 361/45 |
| 5,428,268 | 6/1995 | Melis et al. | 315/247 |
| 5,450,302 | 9/1995 | Maase et al. | 362/276 |
| 5,453,668 | 9/1995 | Chow | 315/307 |
| 5,471,119 | 11/1995 | Ranganath et al. | 315/307 |
| 5,477,111 | 12/1995 | Steely et al. | 315/194 |
| 5,481,160 | 1/1996 | Nilssen | 315/209 R |
| 5,493,182 | 2/1996 | Sowa et al. | 315/291 |
| 5,525,872 | 6/1996 | Achten et al. | 315/291 |
| 5,583,402 | 12/1996 | Moisin et al. | 315/307 |
| 5,770,928 | 6/1998 | Chansky et al. | 315/362 |

| BRIGHTNESS LEVEL | | SECOND DRIVE PULSE | SECOND DEAD TIME | FIRST DRIVE PULSE | FIRST DEAD TIME |
|---|---|---|---|---|---|
| BRIGHTEST | 0 | 32 | 1 | 16 | 1 |
| | 1 | 30 | 1 | 15 | 4 |
| | 2 | 28 | 1 | 14 | 7 |
| | 3 | 26 | 1 | 13 | 10 |
| | 4 | 24 | 1 | 12 | 13 |
| | 5 | 22 | 1 | 11 | 16 |
| | 6 | 20 | 1 | 10 | 19 |
| | 7 | 18 | 1 | 9 | 22 |
| | 8 | 16 | 1 | 8 | 25 |
| FULL | 9 | 14 | 1 | 7 | 28 |
| DIM | 10 | 12 | 1 | 6 | 31 |
| PROTOCOL | 11 | 10 | 1 | 5 | 34 |
| | 12 | 8 | 1 | 4 | 37 |
| LEVELS NOT USED | 13 | 6 | 1 | 3 | 40 |
| | 14 | 4 | 1 | 2 | 43 |
| | 15 | 2 | 1 | 1 | 46 |
| FULL OFF | 16 | 0 | 1 | 0 | 49 |
| | | D=2MSEC | D=0 | D=1MSEC | D=3MSEC |

APPARATUS AND METHOD FOR DIMMING A GAS DISCHARGE LAMP

BACKGROUND OF THE INVENTION

The present invention relates to an apparatus and method for dimming a gas discharge lamp. More particularly, the invention relates to an apparatus and method for dimming a gas discharge lamp in which one or both of the dead time periods between drive pulses are varied or modulated.

Gas discharge lamps are highly efficient sources of light energy. Gas discharge lamps are typically formed of gas filled vessels having electrodes. In order to power the lamp, a high voltage is applied across the electrodes, usually at a high frequency. Gases within the tube become ionized as they are excited by high energy radiation. The light output of the lamp is thus directly related to the input power signal characteristics.

Dimming of gas discharge lamps is well known. A typical method of dimming a gas discharge lamp is disclosed in U.S. Pat. No. 5,045,758 issued Sep. 3, 1991 to Hildebrand which discloses a pulse width modulated alternating current drive signal for energizing the lamp and for controlling the light emission intensity of the lamp. In addition to such modulating of the pulse width or drive pulse of the lamp's drive signal, other prior art examples modulate the frequency of the drive signal. For example, U.S. Pat. No. 4,916,362 issued Apr. 10, 1990 to Orenstein discloses an excitation supply for gas discharge tubes using a variable frequency oscillator. By varying the frequency of the oscillator, the brightness of the gas discharge lamp may be selected. Finally, the prior art discloses signal modulation using various, often more complex and expensive, means. For example, U.S. Pat. No. 5,434,479 issued Jul. 18, 1995 to Matsushita discloses first and second series circuits each series circuit including two switching elements and a connecting point located therebetween wherein ON/OFF timing of the switching elements in the first series circuit varies between in-phase and 180 degrees out-of-phase from ON/OFF timing of the switching elements in the second series circuit. The ON period ratio of the switching elements is different in at least one of the first and second series circuits. The device thereby allows dimming of the discharge lamp. However, the Matsushita device requires a full bridge drive circuit composed of four switching elements.

SUMMARY OF THE INVENTION

The present invention provides a power supply for a gas discharge lamp comprising a converter that converts an input AC power signal to at least one DC signal, an output transformer having a primary winding and a secondary winding, the lamp being connected in circuit across the secondary winding, and a switching network that alternately provides first and second voltage signals across the primary winding such that there is a first dead time period between the first and second voltage signals, and there is a second dead time period between the second and first voltage signals. The switching network includes a first switch that switches the first voltage signal across the primary winding after the second dead time, and a second switch that switches the second voltage signal across the primary winding after the first dead time. The power supply also comprises a switch control circuit that controls the switching of the first and second switches to set the brightness level of the lamp by varying the length of at least one of the first and second dead time periods.

The power supply may also include a driver connected in circuit between the switch control circuit and the switching network that controls the switching network in response to the switch control circuit. Additionally, the power supply may include a sense winding in proximity to the second winding that generates a third signal, and a feedback circuit that provides a signal functionally related to the third signal to shut down the lamp if the third signal indicates that an overvoltage condition exists. The power supply may further include a switch protection circuit that prevents both the first switch and the second switch from conducting at the same time. Such a switch protection circuit may be, for example, a cross conduct inhibit circuit connected to an output of the switch control circuit.

In a preferred embodiment, the switch control circuit may include an input device such as, for example, a potentiometer, to input a selected lamp brightness level. The input device is preferably provided in a distinct module that plugs into the switch control circuit, and may be configured in such a way that removal of the module causes the power supply to shut down the lamp.

The invention provides a dimming module comprising an input device that is used to set the brightness level of the gas discharge lamp and that includes a circuit that communicates to the power supply when the dimming module is connected to the power supply, and a connector that connects the dimming module in circuit to the power supply. The input device may be a potentiometer, a binary switch, a fixed resistance, or a feedback circuit. The dimming module further includes a signal modulator, such as an RC network timer, that communicates to the power supply when the dimming module is connected.

In the preferred embodiment, the first and second switches comprise power metal oxide semiconductor field effect transistors (MOSFETs). Further, the switch control circuit may include a controller.

As used herein, the term "controller" is equivalent to the term "processor," and includes microcontrollers, microprocessors, and other such circuits using discrete components, such as logic gates, that perform the functions described herein.

The power supply may include a number of circuits to control or vary the output in response to predetermined conditions. For example, the power supply may include an averaging circuit, such as a low pass filter, that generates a DC signal indicative of the average total drive pulse time and a comparator for comparing the DC signal with a signal output by the input device. Also, the power supply may include an output sense circuit to vary the signal magnitude if the output, such as the output current, is outside of a predetermined range. Further, the power supply may include a temperature sense circuit that is connected in circuit to the switch control circuit. A temperature sensing device may be positioned in proximity of the MOSFET switches, the lamp itself, or in the ambient atmosphere.

The power supply thereby includes a means for controlling the switches and generating first and second switch control signals in various ways. Such means may include the various embodiments disclosed herein, or other equivalent structures. For example, the microcontrollers may be replaced by discrete components such as logic gates or transistors.

The present invention also provides a method of changing the brightness level of a lamp, the lamp being connected between a first terminal and a second terminal. The method comprises the steps of providing a first switch that is in circuit connection with a source of a first voltage, providing a second switch that is in circuit connection with a source of a second voltage, activating the first switch for a first period to thereby apply a first voltage signal across the first and second terminals, deactivating the first switch for a first dead time period, activating the second switch for a second period after the first dead time period has expired to thereby apply a second voltage signal across the first and second terminals, deactivating the second switch for a second dead time period, and varying at least one of the first dead time period and the second dead time period in response to a brightness control signal.

In one embodiment, the second switch deactivating step may comprise deactivating the second switch for a second dead time that is equal to the first dead time, such that both the first and second dead time periods are varied in response to the brightness control signal. In addition, the second switch activating step may then include activating at least one of the first switch and the second switch for a variable period.

In another embodiment, the second switch deactivating step may include deactivating the second switch for a fixed second dead time. The first and second switch activation steps may then include activating the first switch for a first period, and activating the second switch for a second period longer than the first period. The first switch deactivating step may include deactivating the first switch for a first dead time longer than the second dead time.

In yet another embodiment, the first switch activating step includes activating the first switch for a fixed first period. The second switch deactivation step then includes deactivating the second switch for a fixed second dead time. Further, the frequency may be fixed.

In another embodiment of the invention, the invention provides a ground fault interrupt circuit comprising an avalanche device connected in circuit to the center tap of the secondary winding, and a resistance device connected in circuit between the center tap and a ground line. The ground line may be a utility ground line or a ground network. The avalanche device may comprise a thyristor, such as a silicon controlled rectifier or a triac. The ground fault interrupt circuit may further comprise second and third oppositely biased avalanche devices connected in series between the center tap and the first avalanche device, thereby reducing the circuit sensitivity to small fluctuations.

In yet another embodiment of the invention, the invention provides a ground continuity detector that detects a discontinuity between a utility ground line and the power supply. The ground continuity detector includes a circuit ground line having a voltage that is substantially different in magnitude from the utility ground line, a chassis ground line connected in circuit to the utility ground line, and a ground continuity sensor connected in circuit between the circuit ground line and the chassis ground line. The sensor is capable of generating a ground continuity fault signal when the voltage between the circuit ground line and the chassis ground line varies from a predetermined value. For example, the circuit ground line may be highly negative, around 170 volts below the utility ground line, and the sensor may be configured such that the voltage trip setpoint of the sensor is over about 20 volts.

It is a feature and advantage of the present invention that a gas discharge lamp may be dimmed by varying at least one of the first or second dead time periods.

It is another feature and advantage of the invention that the input device, such as a potentiometer, for dimming may be provided in a plug-in module and configured such that removal of the module causes the unit to be shut down and such that the unit operates at a fixed brightness level if the module is not inserted.

It is another feature and advantage of the invention that dimming may be provided by varying both the first and second dead times while maintaining a constant ratio of drive pulses.

It is another feature and advantage of the invention that a sensing winding and a feedback circuit may be provided such that the feedback circuit provides a signal to shut down the lamp if an overvoltage condition exists.

It is another feature and advantage of the invention that a switch protection circuit, specifically a cross conduct inhibit circuit, is provided that prevents the first and second switches from conducting at the same time.

It is yet another feature and advantage of the invention that the first and second dead times may be varied such that the first and second drive pulses are varied in a fixed ratio. Alternatively, the second dead time may be fixed and the first dead time period may be varied in response to a brightness control signal. Further, the first and second drive pulses may then be modulated such that the first and second drive pulses are varied in a fixed ratio, with the second drive pulse being longer than the first.

Other features and advantages of the invention will become apparent to those skilled in the art upon review of the following detailed description, claims, and drawings.

Figure 1:
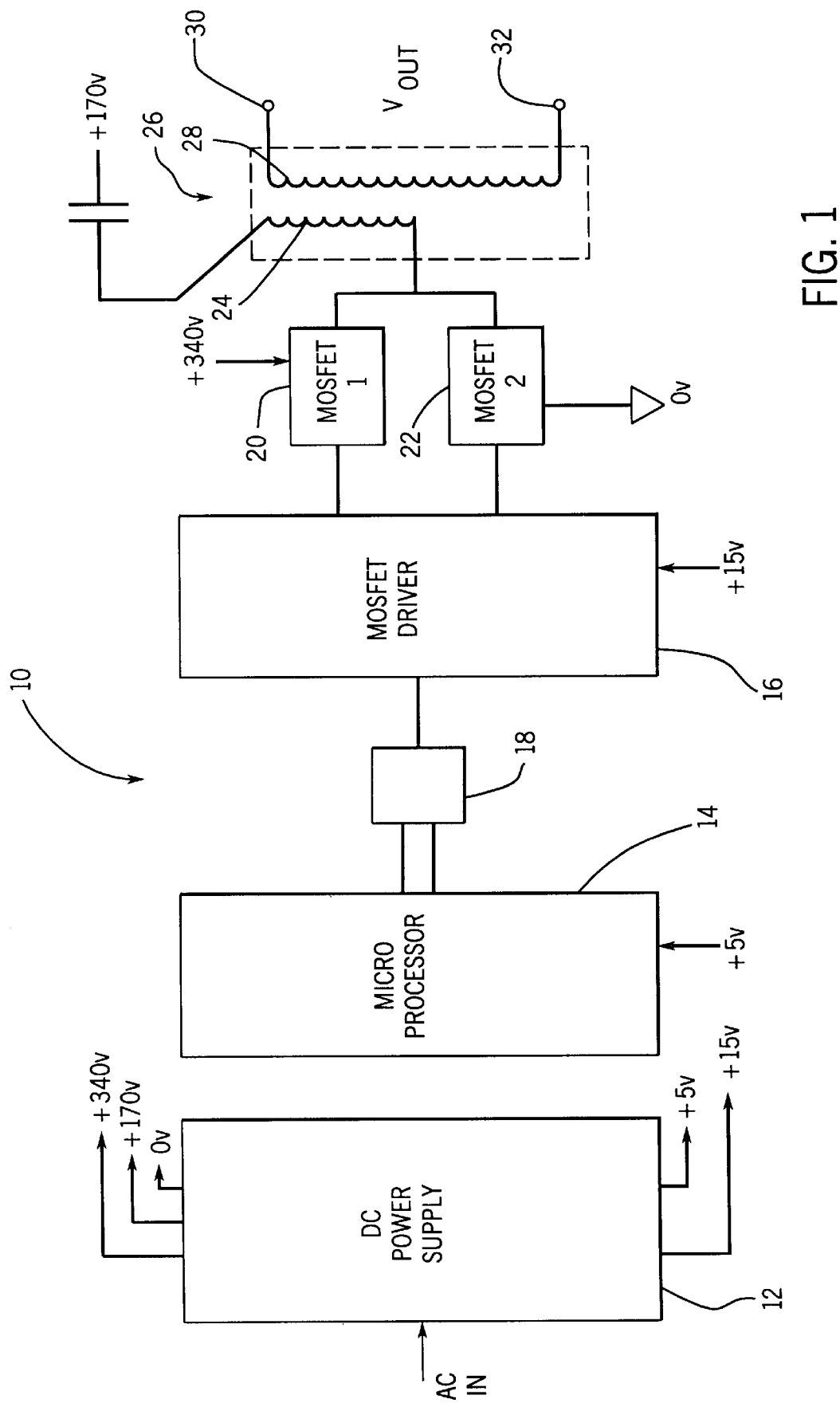
FIG. 1 is a block diagram of a preferred embodiment of a power supply for a gas discharge lamp according to the present invention.

Before one embodiment of the invention is explained in detail, it is to be understood that the invention is not limited in its application to the details of the construction and the arrangements of processes set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE INVENTION

CIRCUIT CONFIGURATION
The Overall Circuit Configuration

FIG. 1 is a block diagram of a preferred embodiment of a power supply 10 for a gas discharge lamp according to the present invention. In FIG. 1, alternating line current is fed into a DC power supply 12 and converted to output at least one DC signal. Several DC signals are output from the DC power supply 12, including 5 VDC and 15 VDC signals to power the switch control circuit and the driver, and 170 VDC and 340 VDC signals (relative to circuit ground) for the power supply output signal. A microprocessor 14, or controller, is part of a switch control circuit. The switch control circuit may also be comprised of discrete components, such as logic gates, instead of a microprocessor controller. The switch control circuit controls the switching of first and second switches to set the drive pulses of the lamp input signal and the brightness level of the lamp by varying the length of dead time periods, as described in further detail hereinafter. The switch control circuit thereby may set the waveform and frequency of the output signal.

The output of the switch control circuit is fed into a MOSFET driver 16. The driver 16 functions to control a switching network, in response to the switch control circuit output. In addition, a switch protection circuit 18, such as a cross conduct inhibit circuit, is included to prevent both first and second switches 20 and 22 from conducting at the same time. The output from the driver is fed into first MOSFET 20 and second MOSFET 22 in a preferred embodiment of a switching network that alternately provides first and second voltage signals across a primary winding 24. The first switch, first MOSFET 20, switches the first voltage signal across the primary winding 24 after a second dead time in the previous cycle. The second switch, second MOSFET 22, switches the second voltage signal across the primary winding 24 after a first dead time. In this way the switching network provides signals across the primary winding 24 such that there is a first dead time period between first and second voltage signals and there is a second dead time period between the second voltage signal and the first voltage signal of the next cycle. The voltage signals are repeated periodically.

The signal output from the switching network is applied across the primary winding 24 of a step-up output transformer 26 which includes a secondary winding 28 connected in circuit to the lamp. The lamp is connected in circuit across first and second terminals 30 and 32 of secondary winding 28. The circuit functions to set the brightness level of the lamp by varying the length of at least one of either the first or second dead time periods. A specific embodiment of the circuit is described in further detail below.

Power Conditioning Circuit

Figure 1A:
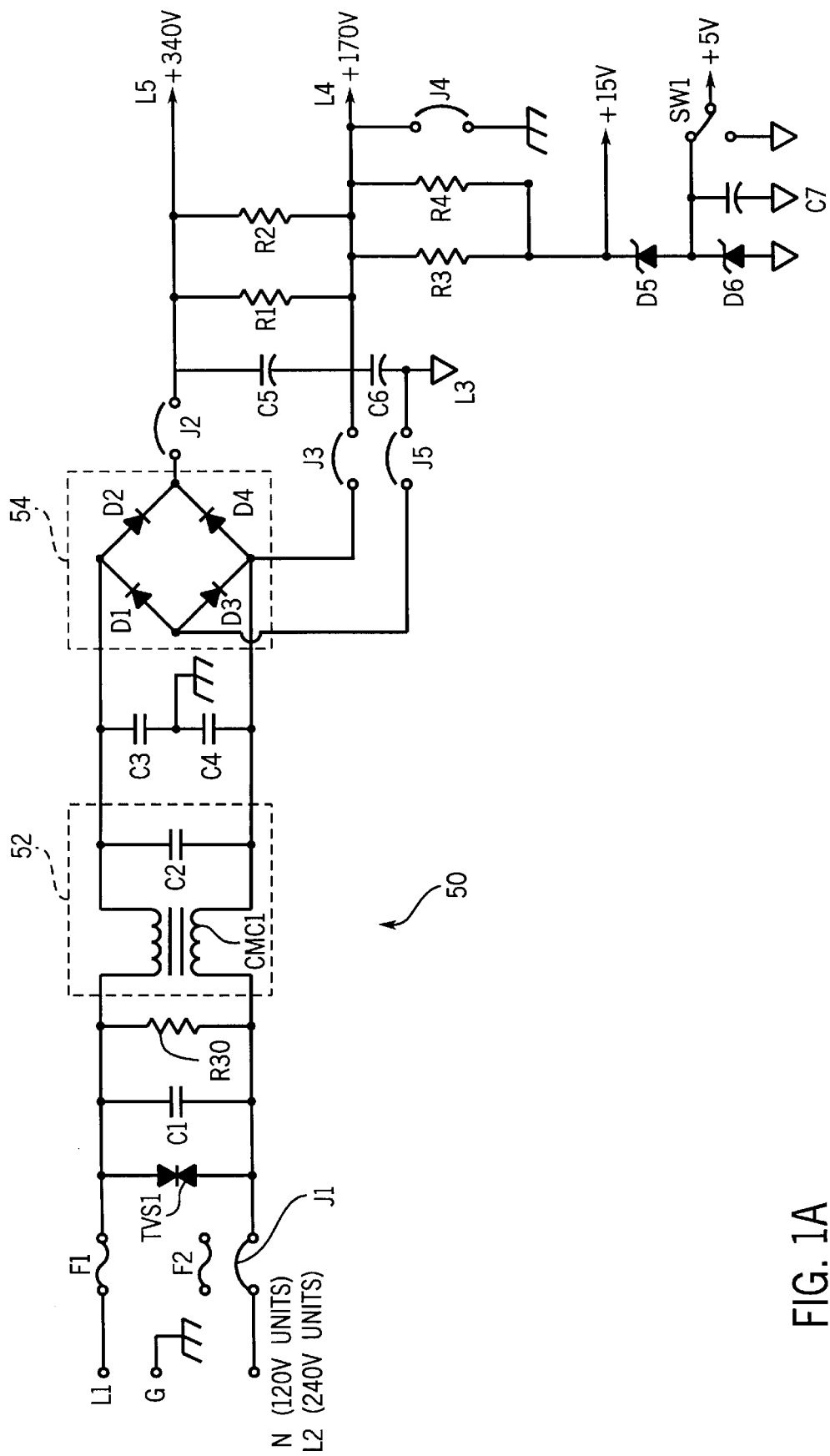
FIG. 1A is a schematic diagram of the input power conditioning portion of the power supply circuit.

FIG. 1A depicts the input power conditioning portion 50 of the circuit shown schematically in FIG. 1. The input power conditioning portion 50 functions as the DC power supply 12 for the power supply circuit 10 (FIG. 1). Power from the utility enters on the left side of the schematic at line L1 and line L2. Line L2 may be the neutral line N if the input power source supply is 120 VAC. If the supply is 240 VAC, then the input power on both lines L1 and L2 pass through fuses F1 and F2. If the supply is 120 VAC, line L1 passes through fuse F1 and the power applied to the neutral line L2 passes through jumper J1 which replaces the second fuse F2. Since the neutral line L2 is then nominally at ground potential, there is no need to pass its signal through a fuse.

The two lines L1 and L2, or the one line and neutral, are then connected to opposite ends of a transient voltage suppressor TVS1, a capacitor C1, and a resistor R30. The transient voltage suppressor TVS1 protects the circuit from any transient input voltage surges. If the input current exceeds a predetermined level, it will cause fuse F1 or F2 to blow. Capacitor C1 absorbs sufficient energy during some power surges to allow power supply 10 to survive undamaged. Resistor R30 bleeds off energy stored in capacitor C1 when power supply 10 is de-energized.

An electromagnetic interference (EMI) filter 52 may be provided in the circuit to reduce electromagnetic interference. EMI signals may be conducted to the line from the supply. In circuits that include EMI filter 52, the two input conductors are connected in circuit to opposite sides of a common mode choke CMC1, which in turn is connected to opposite terminals of a larger film capacitor C2 to reduce the electrical noise conducted to the utility. Jumpers may allow the input power to bypass the filter choke portion of the circuit board in power supplies not including EMI filter 52. Some EMI filtered power supplies in which earth ground is brought into power supply 10 may also include two Y capacitors C3 and C4 that reduce noise conducted to the utility conductors by bypassing it to ground.

The two incoming conductors are then connected to a rectifier 54. In the case of 240 VAC powered power supplies 10, rectifier 54 is composed of 4 individual rectifier diodes D1, D2, D3 and D4 to form a bridge rectifier. In the case of 120 VAC powered power supplies 10, jumper J3 is installed, thereby hard wiring the incoming neutral wire to the center point between two electrolytic capacitors C5 and C6.

By using this configuration, a doubler circuit is formed which allows both 120 VAC and 240 VAC powered power supplies to generate the same supply rails to the lamp with a difference in voltage of approximately 340 volts while allowing most remaining circuitry to be identical. A difference is that power supplies that are powered by a 120 VAC line include jumper J3, and power supplies that are powered by a 240 VAC line do not include jumper J3.

In the 120 VAC configuration, the unused diodes D3 and D4 can be removed or left in the circuit and there is no effect on circuit operation. The negative rail to the lamp is used as the circuit ground point for all low voltage circuitry in other portions of the circuit. Circuit ground is approximately 170 volts more negative than chassis (earth) ground.

Electrolytic capacitors C5 and C6 provide sufficient filtering to provide substantially constant DC voltages for the output drive circuitry while the power input signal moves through its 100 or 120 Hz amplitude fluctuations.

Resistors R3 and R4 provide approximately 8 milliamps to the 15 VDC and 5 VDC circuits, to allow operation of the microprocessor, the MOSFET driver, and other low voltage circuits. Two resistors, as opposed to one resistor, are provided to more evenly disperse the surface heating and the resulting possible effects on adjacent components. These two resistors also bleed the energy stored on capacitor C6 after the power supply 10 has been de-energized. Resistors R1 and R2 perform a similar bleeding function for capacitor C5.

In the 120 VAC input configuration, capacitors C5 and C6 are charged independently, because of jumper J3, to nearly equal potentials. In this case, the discharge of the two capacitors is also essentially independent, and the value of the discharge resistors across the two capacitors need not be matched. To reduce heat dissipation, as well as cost, resistor R1 across capacitor C5 may be eliminated, and resistor R2 is then increased in resistivity and reduced in power rating.

In the 240 VAC input configuration, however, jumper J3 is not installed, and capacitors C5 and C6 are presented as a series load to the incoming voltage from the rectifier 54. It is important that the total incoming voltage, approximately 340 volts, is shared equally between the two electrolytic capacitors C5 and C6, such that the 200 volt rating of both capacitors is not exceeded. In order to accomplish this, capacitors C5 and C6 should preferably see approximately the same DC load. Thus, resistors R1 and R2 have the same power rating. Also, because the voltage drop across resistors R1 and R2 is approximately the same as the voltage drop across resistors R3 and R4 in series with zener diodes D5 and D6, R3 and R4 may have the same power rating as R1 and R2. This provides approximately the same DC load to resistors R1 and R2 as resistors R3 and R4 installed in series with zener diodes D5 and D6.

Resistors R1 and R2, and R3 and R4, are in parallel, rather than series, combinations for several reasons. First, this allows a slight cost reduction by allowing one of the two resistors to be eliminated in the 120 VAC input configuration, as discussed above. Second, in the event that one of the resistors burns out in a 240 VAC power supply 10, the incoming voltage will be split approximately ⅓ and ⅔ between the two electrolytic capacitors C5 and C6, rather than entirely across one electrolytic capacitor, as would otherwise result. This reduces the chances of a failure of the electrolytic capacitor that is subjected to a higher voltage.

Zener diodes D5 and D6 provide a source of 15 VDC and 5 VDC power to the low voltage circuitry. With this circuit configuration, zener diode D5 does not conduct until the 15 volt supply charges to at least 10 volts. This insures that a good source of MOSFET gate drive voltage is provided to the MOSFET driver 16 prior to the 5 volt supply charging and the microprocessor 14 subsequently resetting and beginning operation. Electrolytic capacitor C7 provides filtering of the 5 volt supply. The 15 volt supply only supplies the MOSFET driver 16. Because the MOSFET driver 16 is much less sensitive to power supply noise and ripple than the components attached to the 5 volt supply, such as the microprocessor 14 and the over-voltage protection APPARATUS AND METHOD FOR DIMMING A GAS DISCHARGE LAMP circuitry, no large capacitor is provided to filter the 15 volt supply. The ceramic bypass capacitor C12 or C15 attached to the driver provides sufficient filtering for the 15 volt supply.

15 VDC and 5 VDC are developed any time the power supply is plugged into the utility. The 15 volt supply is always connected to the MOSFET driver 16. A power switch SW1 powers down the power supply 10 by removing power from the components powered from the 5 volt supply, including the microprocessor 14. This prevents drive signals from being developed, and prevents the power supply 10 from providing power to the lamp. Power switch SW1 connects the 5 volt lamp supply rail to either the 5 volt source, effectively the capacitor C7, or to ground and thereby provides fast transitions in the 5 volt supply and rapid turn on/turn off performance. Additionally, because the electrolytic capacitor C7 is located before power switch SW1, power switch SW1 experiences no large capacitive discharges when it is turned OFF. This allows the use of an inexpensive switch with low contact current ratings.

Switch Control Circuit

Figure 1B:
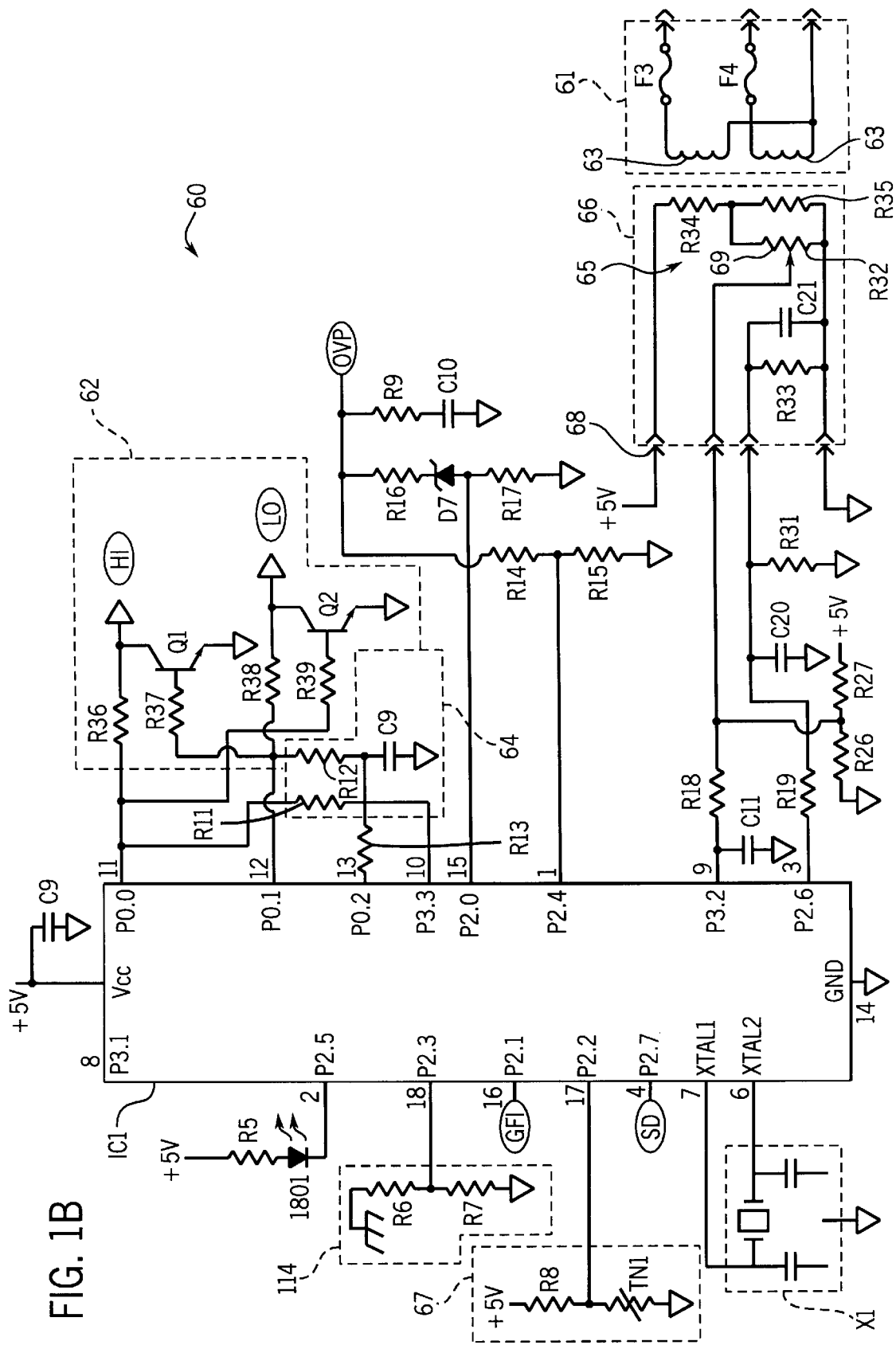
FIG. 1B is a schematic diagram of the switch control circuitry portion of the circuit, including a microprocessor controller.

FIG. 1B shows the microprocessor portion 60 of the circuit. A Zilog Z86C04 microprocessor is preferably used in this design. A family of similar Zilog processors is available from Zilog, Inc., of Campbell, Calif., namely the Z86C02, Z86C04, and Z86C08. The primary difference between these three devices is the amount of code memory, the Z86C02 having 512 bytes, the Z86C04 having 1024 bytes, and the Z86C08 having 2048 bytes. Also, the Z86C04 and Z86C08 also have an additional timer (2 total), and twice as much RAM memory as the Z86C02. The Z86C02 is rated at 8 MHz, and the Z86C04 and Z86C08 are rated at 12 MHz. Because the additional RAM was not needed in the preferred embodiment. The Z86C04 is preferably used to reduce costs. Also, the Z86C02 processor rated at 12 MHz is available from Zilog for only a small extra cost.

Microprocessor 14, depicted in block form in FIG. 1, is shown as microprocessor IC1, or controller, in FIG. 1B. In operation, microprocessor IC1 provides the timing signals that cause driver IC2 or IC3 (FIG. 1C) to turn MOSFET switches 20 and 22 ON and OFF at the correct times. These signals are output on ports P0.0 (high side) and P0.1 (low side).

After a system reset has occurred, microprocessor IC1 follows a preset drive sequence which, among other things, insures that both MOSFETs are never turned ON at the same time. However, prior to the completion of the reset sequence, the microprocessor's port pins are in undefined states, and there is a possibility of driving both drive signals HIGH at the same time.

A cross conduct inhibit circuit 62 is composed of transistors Q1 and Q2 and resistors R36, R37, R38, and R39. The cross conduct inhibit circuit 62 is a specific form of switch protection circuit 18 in FIG. 1, and insures that any occurrence of both signals simultaneously HIGH at the microprocessor port pins is not sent to the MOSFET driver 16. For either output from this circuit to go HIGH, the associated signal from the microprocessor must be HIGH, and the opposite signal from the microprocessor must be LOW. Turning on both MOSFETs simultaneously may destroy both MOSFETS and possibly other circuitry. The truth table of cross conduct inhibit circuit 62 therefore is:

| A | B | A' | B' |
|---|---|----|----|
| 0 | 0 | 0  | 0  |
| 1 | 0 | 1  | 0  |
| 0 | 1 | 0  | 1  |
| 1 | 1 | 0  | 0  |

A and B are the input conditions and A' and B' are the corresponding output conditions. When A and B are both ON, the outputs of cross conduct inhibit circuit 62 (FIG. 1) are both OFF.

Figure 1C:
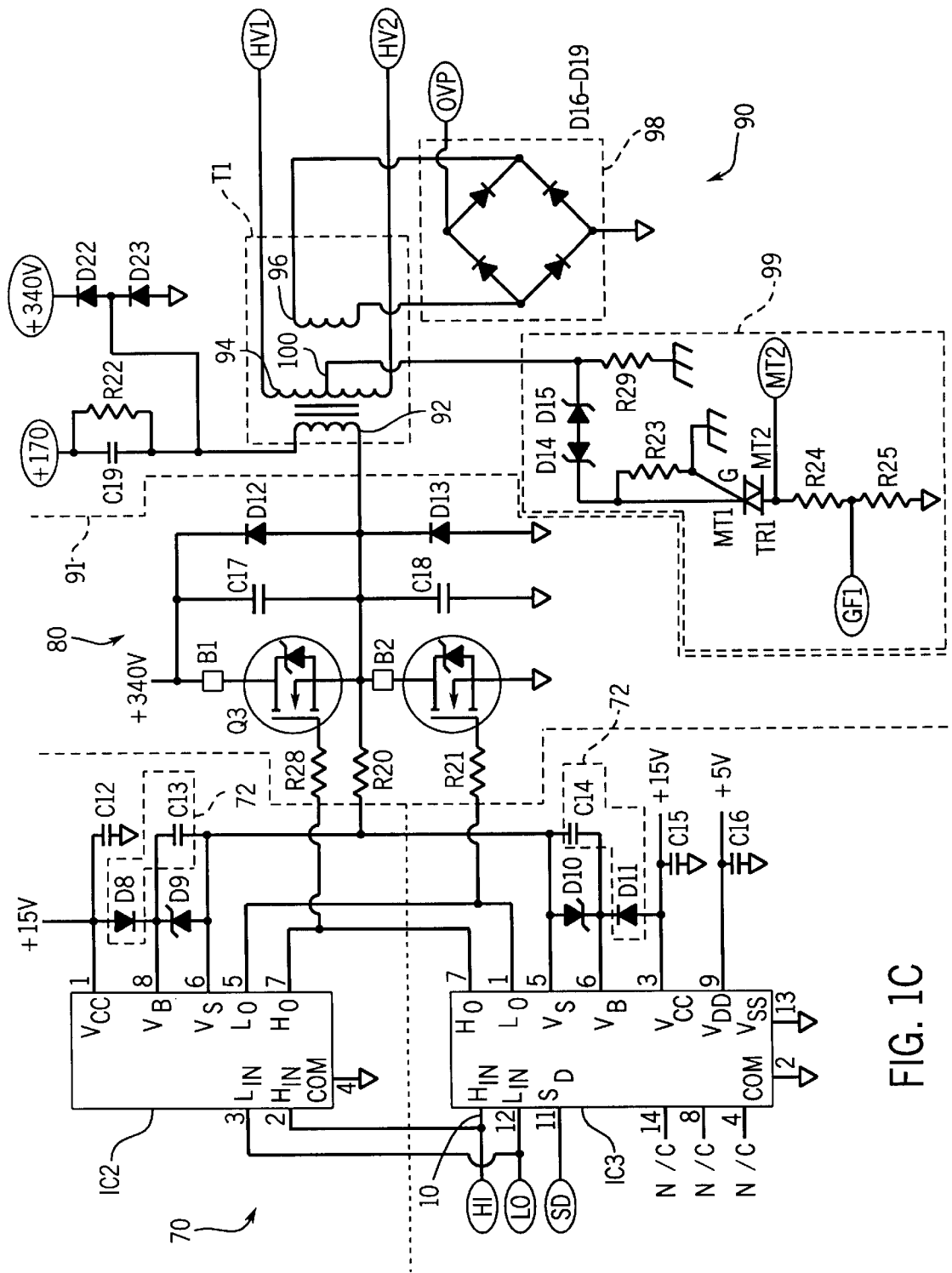
FIG. 1C is a schematic diagram of the MOSFET driver, MOSFET halfbridge switching network, and output transformer portions of the circuit.

As implemented by cross conduct inhibit circuit 62 in FIG. 1B, resistors R36 and R38 may have values of 1 KΩ and resistors R37 and R39 may have values of 10 KΩ. HI and LO signals are sent from ports P0.0 and P0.1, respectively through cross conduct inhibit circuit 62 to the driver IC2 or IC3 (FIG. 1C). If one of the signals from microprocessor IC1 is high, and for some reason a high signal is sent from the other port, then the signal from the other port will be sent to the base of transistor Q1 or transistor Q2, thus turning the transistor on and clamping the HI or LO output line from cross conduct inhibit circuit 62 to circuit ground and preventing simultaneous signals.

Resistors R11 and R12 and capacitor C9 form a low pass filter 64 that develops a DC level at port P3.3 that is proportional to the average combined drive pulse of the drive outputs. In this way, the low pass filter 64 functions as an averaging circuit for obtaining the average total time of the first and second switches (first and second drive pulses DC1 and DC2 as described hereinafter) and generating an indicative DC voltage. This DC voltage signal is compared to the selected brightness level selected using the potentiometer 65 (brought in on port 3.2) using the microprocessor's built in comparator, and allows the actual brightness level of the lamp to be adjusted to the selected lamp brightness level. To prevent the output from hunting between two adjacent brightness levels, the voltage developed on capacitor C9 is biased up or down with a hysteresis output from microprocessor IC1 (at port P0.2) by way of resistor R13. The values of resistors R11, R12 and R13 determine the amount of hysteresis provided, which is preferably slightly more than the difference between two adjacent brightness levels.

In operation, the hysteresis output is set HIGH prior to checking to see if the brightness level needs to be increased a level, and set LOW prior to checking to see if the brightness level needs to be decreased a level. Checks for increases and decreases are performed on alternate trips through the software service routine, and the hysteresis bit is set just after potentiometer 65 is read to allow the filter to equalize prior to reading it during the next service routine, as described hereinafter.

In FIG. 1B, the brightness selecting input device is not included on the circuit board, but instead, is mounted on a snap-in module 66. While the preferred embodiment describes the dimmer potentiometer 65 being part of a separate dimmer module, it is apparent the dimmer potentiometer 65 may be included as part of the main circuit. Without module 66, the circuit will power the lamp at full brightness at all times unless preset at a specific level. To convert the power supply 10 to fully dimmable, dimmer module 66 is plugged into the side of the case and mates with connectors 68 composed of pads or jumpers on the surface of the circuit board. The power supply enclosure will have a break away area to accommodate dimmer module 66. Once installed, removal of dimmer module 66 will be very difficult due to locking mechanisms. In an alternate embodiment, removal of the dimmer module 66 may shut off power to the lamp.

The connection to dimmer module 66 will preferably be made only once. It may be necessary to plate the contact areas on the main circuit board with gold. Gold is helpful in insuring good electrical contact due to the extremely low current levels associated with the potentiometer. By using gold connections, the connectors 68 on the dimmer module 66 will be ably to merely touch the connectors 68 on the main board. Otherwise, such connections must be made more firmly.

Within dimmer module 66, dimmer potentiometer 65 develops a voltage, depending on the potentiometer setting, which corresponds to the desired brightness level. This voltage is coupled to microprocessor IC1 (at port P3.2, a comparator input) via the connector 68 interface and the low pass filter composed of resistor R18 and capacitor C11.

Inexpensive potentiometers of the type used in the illustrated embodiment of dimmer module 66 have extremely poor tolerances, typically as much as 20% or greater. In order to insure that all power supplies 10 (FIG. 1) produced have identical dimming ranges covering the full range of possible brightness values regardless of the exact value of the potentiometer, potentiometer 65 is connected to a voltage divider composed of two precise, yet inexpensive, resistors R34 and R35 (FIG. 1B). Because the resistors R34 and R35 have a much lower impedance value than the potentiometer 65, the voltage value at the upper terminal 69 of potentiometer 65, and the voltage delivered to microprocessor IC1 at maximum potentiometer setting, is nearly exactly ½ of the control circuit voltage Vcc which powers microprocessor IC1. Because both the potentiometer voltage and the output drive pulse sensing filter voltage at port P3.3 are proportional to Vcc, even variations in Vcc do not affect the operation of the dimmer. This allows the use of the very simple and inexpensive zener diode based Vcc supply that is used to provide +5 VDC (FIG. 1A), rather than requiring the use of a relatively expensive voltage regulator. In this particular embodiment, it is necessary to set the maximum potentiometer output to ½ Vcc rather than full Vcc, due to the limit in common mode input range of the comparator within microprocessor IC1. Specifically, values within about 1 volt of Vcc cannot be read. Also, due to the particular characteristics of the drive algorithm, a resistor R32 may be added as shown to better match the sensing input voltage expected at port P3.3 of the microprocessor. This eliminates most of the dead range at the end of the potentiometer travel.

In order to determine if a dimmer module is attached to the power supply, microprocessor IC1 checks to see if a parallel RC circuit is attached between port P2.6 and circuit ground as part of its initialization routine. The dimmer module contains this RC network, shown as resistor R33 and capacitor C21. Port P2.6 is initially set high, as an output, and is left in that state sufficiently long to charge the capacitor, if present. Resistor R19 limits the peak current from this port as a protective measure. Port P2.6 is then reconfigured as an input, and the amount of time required for the signal to change from high to low as resistor R33 discharges capacitor C21 is determined. If this time value falls within a preestablished window, the RC circuit, and thus the dimmer module, is assumed to be present. If not, the power supply is assumed to be non-dimmable and operates in full intensity mode regardless of the analog voltage on port P3.2.

Resistors R26, R27, R31 and capacitor C20 will normally not be included. However, these components can be added to allow fixed brightness power supplies to be built for special applications. Resistor R31 and capacitor C31 simulate the RC network in the dimmer module to instruct the microprocessor to enable the dimming feature. Resistors R26 and R27 fix the voltage level at port P3.2 to set a selected brightness level. Resistors R26 and R27 may be changed in order to set different brightness levels. In this way, the same software can be used for both fixed and variable dimming power supplies 10 (FIG. 1). Alternatively, a special version of the software could be written for a specific brightness level, and resistors R26, R27, R31, and C20 could be left out. Alternately, a binary switch may be used as the input device. For example, a binary switch could replace the entire analog brightness level setting scheme, including the potentiometer 65 and the low pass filter composed of resistor R18 and capacitor C11. Such a binary switch would typically have a 3 or 4 bit digital input directly to the microprocessor IC1. A 3 bit switch would allow 8 brightness levels and a 4 bit would allow 16. The microprocessor IC1 would periodically read the digital value from this input, and set the output level to match the input.

In still another embodiment of the invention, the software may be modified such that the lamp changes between brightness levels in a selected fashion. For example, the software could function to operate the lamp at a fixed brightness level for a selected number of cycles, then operate the lamp at a brightness level that is selected by the input device for a selected number of cycles. Thus, the lamp would alternate periodically between selected brightness levels. For some applications, it may be desirable to alternate between two fixed brightness levels, such as off and maximum brightness, and for some applications it may be desirable to alternate between a fixed brightness level and a variable brightness level. In more complex versions of the software, it may be desirable to change the brightness of the lamp to several different selected levels. In this way, the power supply can cycle through a startup test of the lamp, or perform aesthetically pleasing variations.

In FIG. 1B, resonator X1 is a 12 MHz ceramic resonator that provides the basic time base for microprocessor IC1, and thus establishes all operating times and frequencies. A crystal could also be used as a more accurate time base. A resonator is normally less expensive than a crystal, and eliminates two components, namely load capacitors, since they are contained within the particular resonator used in this embodiment.

A temperature sense circuit 67 is comprised of a thermistor TH1 and a resistor R8. Thermistor TH1, a negative temperature coefficient (NTC) thermistor, protects the power supply circuitry from damage due to overheating. It is normally bonded to the front of one of MOSFETs 20 or 22 making up the half bridge, in order to sense the temperature at the MOSFETs, since they are the components that are most likely to overheat and therefore are susceptible to over temperature failure within the power supply. Instead of a thermistor, the temperature sense circuit 67 may be configured to use a temperature sensing IC as a sensing device for a more linear voltage to temperature relationship.

Such a temperature sense circuit may also be used in other configurations. For example, mercury/argon lamps may be very temperature sensitive. Cold lamps will not illuminate properly and warm lamps may fail prematurely. Therefore, it is preferable to operate the lamps within a desired temperature range. This may be accomplished by increasing the drive currents at startup or when the lamp is colder, and decreasing the drive current when the lamp is warmer. The temperature sensing device may thus be positioned in the surrounding atmosphere or near the lamp itself. If the sensing device is in the surrounding atmosphere to sense the ambient environment, then the algorithm of the microprocessor may be changed to compensate for ambient conditions. If the sensing device is proximate to the lamp, then the algorithm may compensate to more directly control the lamp temperature.

Further, instead of, or in addition to, the input to port P2.2 (FIG. 1B), a temperature sense circuit 67 may be connected directly to the input device 66. In this way, a temperature sense circuit would take the place of potentiometer 65 as the output level control to the microprocessor IC1. In such a way, the temperature sense circuit 67 may be used to generate a feedback signal when the sensed temperature is higher or lower than a selected value, and communicate the feedback signal to the switch control circuit.

Port P2.2 is monitored by the software's fault routine portion of the service routine. A transition to a LOW state indicates an over temperature fault. If a fault is detected, the power supply 10 is shut down and allowed to cool. Two more attempts to operate are made after the fault clears. If the fault keeps reoccurring, the power supply 10 is permanently shut down, until being reset by cycling the input power at switch SW1. Resistor R8 keeps port P2.2 high if the temperature is sufficiently low. The temperature trip point of thermistor TH1 may be changed by selecting a different thermistor TH1 or resistor R8. Also, since the three seconds allowed prior to a restart attempt is very short compared to the cooling times of the MOSFETs 20 and 22 (FIG. 1), it is very likely that one over temperature event will cause permanent shutdown.

Resistors R6 and R7 monitor the chassis ground connection to insure that the earth ground connection to the power supply 10 has not been lost, and thereby comprise a ground continuity detector 114. Since earth ground, chassis ground, is normally 170 volts more positive than circuit ground, port P2.3 is normally kept in a high state. However, if the ground connection is broken, R7 will force port P2.3 low, which indicates a ground continuity fault. The microprocessor contains clamp diodes on its port pins, which prevent damage from the excessive voltage that would otherwise be seen on port P2.3. Much like the temperature sense port P2.2, port P2.3 is also monitored by the fault routine, and again a total of three attempts to operate are attempted prior to a permanent shutdown. Another embodiment of the ground continuity detector 114 is shown in further detail hereinafter in FIG. 2C and described in the accompanying text.

The ground continuity detector 114 may only be used if a ground line is provided by the utility. Therefore, for power supplies that are made for a power source having with a utility ground line, the preferred embodiment of the power supply includes a ground continuity detector. For power supplies not having a utility ground line, the preferred embodiment of the power supply does not include a ground continuity detector.

On power supplies 10 (FIG. 1) built for use with utilities with no ground connections, jumper J4 (FIG. 1A) should be installed. This will prevent this ground continuity circuitry from causing a fault condition.

Once a permanent shutdown has occurred, light emitting diode LED1 is flashed by a signal output from port P2.5, with the number of flashes in sequence indicating the fault (such as over voltage, ground fault, over temperature, under voltage or ground continuity) that has occurred. Resistor R5 establishes the current through the LED during flashing.

Capacitor C8 is a bypass capacitor, which provides some filtering of the power supply at microprocessor power pin 5. This smoothes the power available for the microprocessor and helps prevent switching transients of the microcontroller from affecting other circuitry powered from the same supply.

The Zilog Z8 microprocessors have a feature called port autolatch. This feature causes a floating port pin to be pulled to the nearest rail with up to 30 microamps of current in order to reduce the excessive power supply current that could be caused by intermediate port states. Because of this feature, any resistor that is depended upon to pull a port pin to one of the two rails must be small enough in value to overcome the auto latch currents. Because the autolatch currents can be up to 30 microamps and the voltage for a high or low should be within 1 volt of the respective rail, the maximum acceptable value for pull up or pull down resistors is 33 KΩ. This is a motivating factor for selecting the values for resistors R7, R8, R15, R17, R25, R31 and R33.

Power Output

FIG. 1C shows the power output portion of the circuit. On the left side of the schematic, drivers IC2 and IC3 represent two possible driver implementations. The circuit board will be designed to accept either driver to provide more flexibility, but preferably only one driver (along with its associated diodes and capacitors) will be included. International Rectifier of El Segundo, Calif., is a source for both drivers. The 14 pin drivers are preferably used and have a second source, Harris Semiconductor of Melbourne, Fla. The 8 pin drivers may be less expensive, and may function adequately in this circuit.

MOSFETs 20 and 22, depicted in block form in FIG. 1, are shown in FIG. 1C as MOSFETs Q3 and Q4. The driver IC2 or IC3 in use accepts the high and low drive signals from the microprocessor, and converts them to a high current drive for the two MOSFETs Q3 and Q4. MOSFET Q3 is the high side switch, and MOSFET Q4 is the low side switch. The higher current reduces switching times. The 14 pin driver IC3 also receives a third signal from the microprocessor (SD or shutdown), which provides an additional means of controlling (turning off) the output of driver IC3. This is relatively unimportant, since the high and low drives are sufficient to implement this function. The driver IC2 or IC3 also provides the function of allowing the high side MOSFET drive to float, which is critical to operation, since the high side MOSFET's gate and source terminals float with the half bridge's output signal.

Capacitors C12, C15 and C16 are bypass capacitors. Diode D8 and capacitor C13, or diode D11 and capacitor C14, form a bootstrap power supply 72, which provides power to the high side drive stage when the high side drive stage is floating. The bootstrap power supply 72 is recharged from the low side 15 volt supply while low side MOSFET Q4 is conducting. Zener diode D9, or D10, limits the extent of the damage in the event of a high side MOSFET failure. Typically, the diodes D9 or D10 cause the associated gate resistor (R20 and/or R28, or R21) to fail rather than allowing the driver, IC2 or IC3, to fail.

MOSFETs Q3 and Q4 form the half bridge MOSFET driver 80 (shown in block form as 16 in FIG. 1) that drives the primary 92 of the output transformer T1. Resistors R20, R28 and R21 are gate resistors, which provide damping for the gate drive to prevent potentially damaging high frequency MOSFET oscillation, and limit the gate current to help reduce EMI. The value of these resistors may be increased to further reduce EMI by reducing the MOSFET switching speed. However, limiting switching speed may increase MOSFET heating.

Ferrite beads B1 and B2 may be used to help reduce conducted EMI. If not used, they should be replaced with jumpers on the circuit board. Capacitors C17 and C18 may also be used to limit EMI by limiting the MOSFET switching speed. However, these capacitors must be used with great care, as they contribute to MOSFET heating in two ways. First, they slow the switching speed, which creates linear operation losses. Second, each time the MOSFETs switch to a conducting state, the energy stored in the capacitors must be dissipated in the MOSFET. This second effect can be reduced somewhat by using ceramic rather than film capacitors. Because ceramics are more lossy than film capacitors, some of the energy is dissipated in the capacitor rather than the MOSFET. However, the total energy dissipated remains the same for capacitors of the same value.

Diodes D12 and D13 are high speed diodes that clamp the half bridge's drive output to the supply rails, to prevent the drive output from exceeding the supply rails by more than a the voltage drop of the diodes. The body diode 82 of MOSFET Q4 would normally provide this function in place of D13, and the body diode 84 of MOSFET Q3 would normally provide this function in place of diode D12, but these intrinsic body diodes are too slow to insure that no damage occurs to the driver. The negative clamping action of diode D13 is particularly important, since the specification for the drivers states that the Vs pin should not be allowed to go more negative than 5 volts below the common pin. Even very brief negative Vs excursions, on the order of tens of nanoseconds, can cause an excessive consumption of power by the driver. To provide further protection for the Vs pin of the driver, the gate resistor R28 for the upper MOSFET may be split into two resistances, with most of the resistance moved from the gate terminal (the normal configuration) to the Vs terminal. While this provides unchanged damping and speed control for MOSFET Q3, it provides sufficient additional protection for the Vs terminal of the driver to reduce the current consumption in this embodiment to an expected value of less than 2 mA. While this could be accomplished by moving all of the resistance to the Vs line, a small portion of the resistance, for example 10 ohms in resistor R28, is preferably left in series with the gate, to help insure no high frequency oscillations occur due to the placement of the gate lead trace on the board. The reduction in supply current is critical when the power for circuit operation is supplied from a dropping resistor (resistors R3 and R4 in FIG. 1A) attached to the utility derived high voltage supply. Any increase in supply current demand results in a substantial increase in heating of the dropping resistor.

Capacitor C19 is the DC blocking capacitor. The capacitor prevents staircase saturation of the transformer T1 core by ensuring that the algebraic sum of the volt seconds applied to the primary winding 92 is very near zero. It also blocks the direct DC path from electrolytic capacitors C5 and C6 (FIG. 1A), through the primary winding 92, to MOSFETs Q3 and Q4. Such a DC current would quickly destroy one on the MOSFETs if an abnormality in the circuit operation caused one of the MOSFETs to stay ON for an abnormally long period of time. Resistor R22 insures that the DC voltage at the junction of the DC blocking capacitor (capacitor C19) and the primary winding 92 is very nearly at the voltage of the junction of the two electrolytic capacitors C5 and C6 (FIG. 1A). Resistor R22 also provides some dampening for the resonant circuit formed by the capacitor C19 and the primary winding 92, and provides a low current DC path from the electrolytic capacitors C5 and C6 to the MOSFETs.

Transformer T1 steps up the voltage to the potential needed to drive the lamp load. Preferably, it has a 100 turn primary winding 92 and a 4000 turn secondary winding 94, although this may be changed as conditions require. The construction of transformer T1 is such that a loose magnetic coupling exists between the primary and the secondary. Because of this, the load current changes very little with large changes in the gas load voltage, which is primarily determined by the gas load.

A third sense winding 96 of nominally 10 turns is wound in close proximity to the secondary, such that it can sense the secondary voltage. The close proximity is required due to the leaky nature of the transformer T1. Because of the high voltage developed by the secondary winding 94, special techniques must be employed to prevent a breakdown from the secondary 94 to the sense winding 96. A special, seventh bay may be added to the secondary bobbin to accommodate the sense winding and yet provide the necessary voltage isolation. Alternatively, the secondary winding 94 may be wound such that the wire at the top of one of the two inner bays is at center tap potential, allowing the sense winding 96 to be wound at the top of that bay.

The voltage developed by the sense winding 96 is rectified by a bridge rectifier 98 composed of D16 through D19. As shown in FIG. 1B, the rectified signal at overvoltage protection circuit OVP is filtered by resistor R9 and capacitor C10, and applied to two divider networks. The first, composed of resistor R16, zener diode D7, and resistor R17 develops a digital signal for an over voltage condition which is applied to port P2.0 of microprocessor IC1. Thus, a feedback circuit is provided that provides a signal functionally related to the sense winding signal to shut down the lamp if an overvoltage condition exists. If an overvoltage condition exists at the port P2.0, this port pin will be taken HIGH, indicating a fault.

The second network (FIG. 1B), composed of resistors R14 and R15, checks for a minimum voltage condition. If the voltage falls below a minimum value, port P2.4 is taken LOW, indicating a fault. The primary purpose of this second network is to monitor the integrity of the over voltage circuitry to port P2.0. If, for example, the sense winding 96 were to open, the over voltage circuitry to port P2.0 would no longer be able to detect an over voltage condition. The under voltage circuitry at port P2.4 would then indicate a fault.

These two inputs are monitored by the fault sense software, described hereinafter (see FIG. 3D), which will shut the power supply 10 (FIG. 1) down if a fault condition exists. A change in the number of turns on the sense winding 96 changes the sensitivity (voltage setpoint) of both the over voltage and under voltage circuits. Changes to resistors R14 or R15 change the under voltage sensitivity without affecting over voltage operation. Changes to resistor R16, diode D7, or resistor R17 change the over voltage sensitivity without affecting under voltage. Note, however, that the value of resistor R15 is limited to about 33K ohms because of autolatch considerations of the particular microprocessor, as previously discussed. As a result, resistor R14 may be chosen to be about 10K to reduce the total impedance to the sense winding 96. As such, the minimum acceptable load voltage will be about 2K volts peak to peak. If more voltage is necessary, then the number of turns on the sense winding 96 may be increased, and the value of diode D7 increased accordingly.

Referring again to FIG. 1C, the ground fault circuit 99 is composed of diodes D14 and D15, resistors R23, R24, R25 and R29, and triac TR1. Ground fault circuit 99 uses triac TR1 in a unique non-latching mode to directly sense current from the center tap 100 of the secondary winding 94 to chassis (earth) ground, which is ground fault current. However, the center tap 100 to earth ground voltage is never allowed to rise above set limits. On power supplies built for use with utilities without ground connections, jumper J4 should be installed (FIG. 1A). This will allow ground fault currents to be detected with this circuit, even though no earth ground connection exists.

As shown in FIG. 1B, the ground fault condition is presented to the microprocessor at port P2.1. A HIGH on this port pin indicates a fault. This pin is monitored by the fault software, which will shut the power supply 10 down if a fault condition exists. The sensitivity of the ground fault circuit (current trip point) is changed with a change to the current sensing resistor R29.

Given the relatively electrically noisy environment in which this circuit operates, it may be desirable to place bypass capacitors on all of the fault input pins to the microprocessor in order to eliminate noise generated false fault indications. These capacitors have been eliminated, with the necessary signal filtering performed instead in software without the fault sensing routine. Multiple positive fault samples are required in order to confirm the fault.

It is possible to connect another complete output circuit as represented in FIG. 1B by duplicating everything to the right of dashed line 91 in FIG. 1C, namely, the transformer portion of the power output section. This will provide a second isolated output for driving very large multi-segment lamps. The second transformer would be driven from the same half bridge MOSFET driver as the first, and the second circuit's ground fault interrupt and over voltage protection and OVP circuits would be paralleled with those of the first circuit and monitored with the same microprocessor pins as the first. A fault condition on either output would generate a fault response from the microprocessor. Changes to the input fuses, rectifier diodes, and EMI choke (if installed) would probably be needed to allow for the higher line current. No other circuit changes should be required. This dual output configuration shall be considered an alternate embodiment of the present invention.

As shown in FIG. 1B, in some cases it may be desirable to have an auxiliary power source 61 of isolated power available to power outside equipment. The power may be derived from, for example, two 6 turn windings 63 wound over the top of the transformer T1 primary winding 92. Pads for fuses F3 and F4, winding connections, and a connector will be available on the circuit board to allow this provision without the addition of a daughter board.

ALTERNATE CIRCUITS

Current Sense Circuit

Figure 2A:
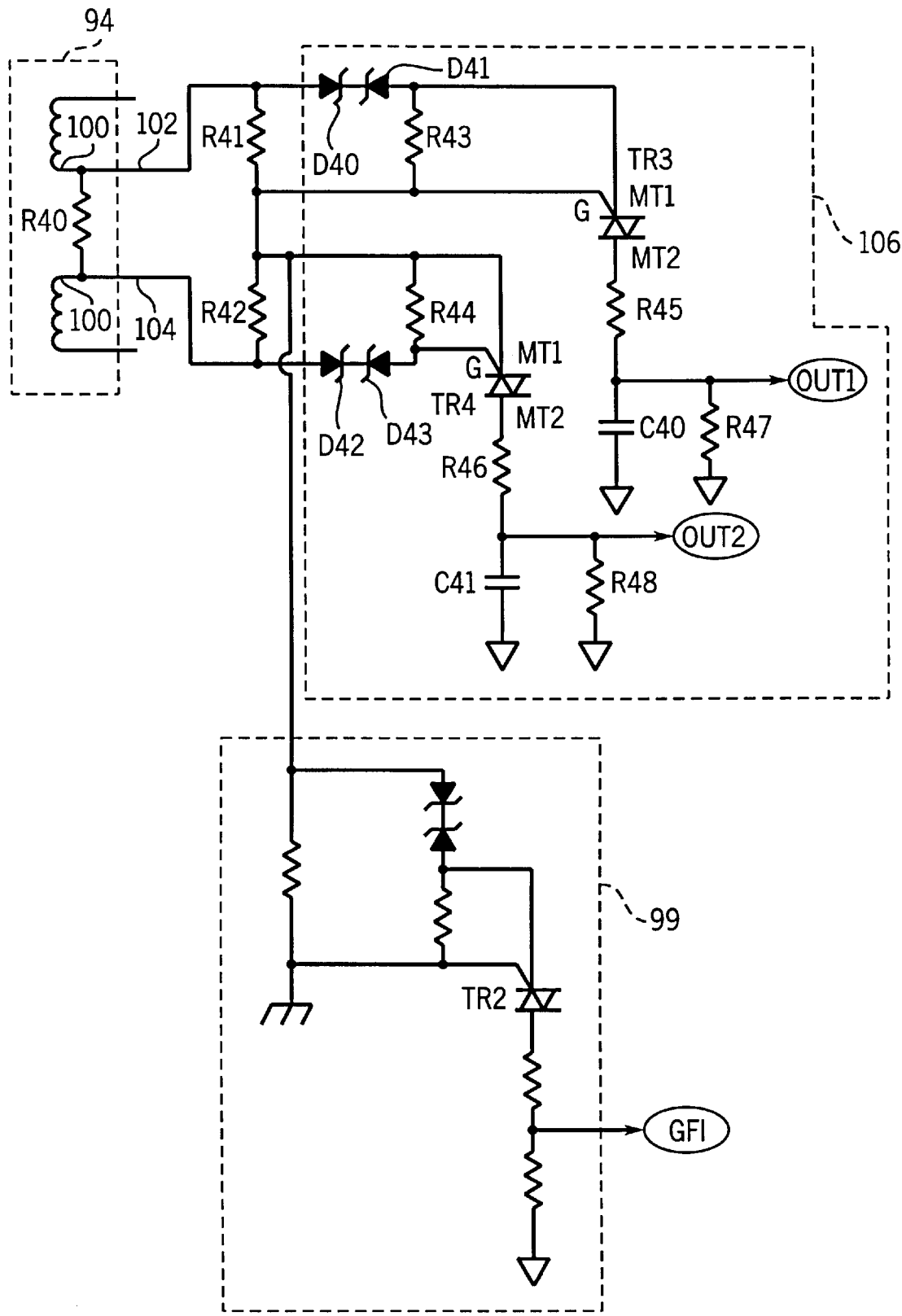
FIG. 2A is a schematic diagram of a portion of the circuit, including a current sense circuit and a ground fault interrupt circuit, in an alternative embodiment of the invention.

FIG. 2A depicts an alternate embodiment of a portion of the power supply circuit 10, in which like numbers correspond to like elements in FIGS. 1A, 1B, and 1C. A single center tap 100 is normally brought out from the power supply's output transformer secondary winding 94, as shown in FIG. 1C.

The circuitry of FIG. 2A effectively detects the current through the secondary winding 94 (FIG. 1C) and feeds a signal back to the microprocessor IC1, such that the output current of the power supply 10 (FIG. 1) may be constrained within a range, and thereby comprises an output sense circuit. In order to implement this current sensing scheme, the center tap from the secondary winding 94 is split, and two leads 102 and 104 are brought out. Leads 102 and 104 are connected within the secondary winding 94 by a resistor R40.

The two leads are further connected outside the secondary with the series combination of resistors R41 and R42. Resistors R41 and R42 are in parallel with resistor R40. Any common mode current that flows through the transformer secondary winding 94 must flow through resistors R40, R41 and R42. Therefore, a voltage is developed across these resistors that is proportional to the current through the secondary winding 94. Resistor R40 is not necessary from the standpoint of circuit function, but is included to insure that continuity exists between the two halves of the secondary winding 94 in the event of failure of either resistor R41 or R42 or the interconnecting traces.

Figure 2B:
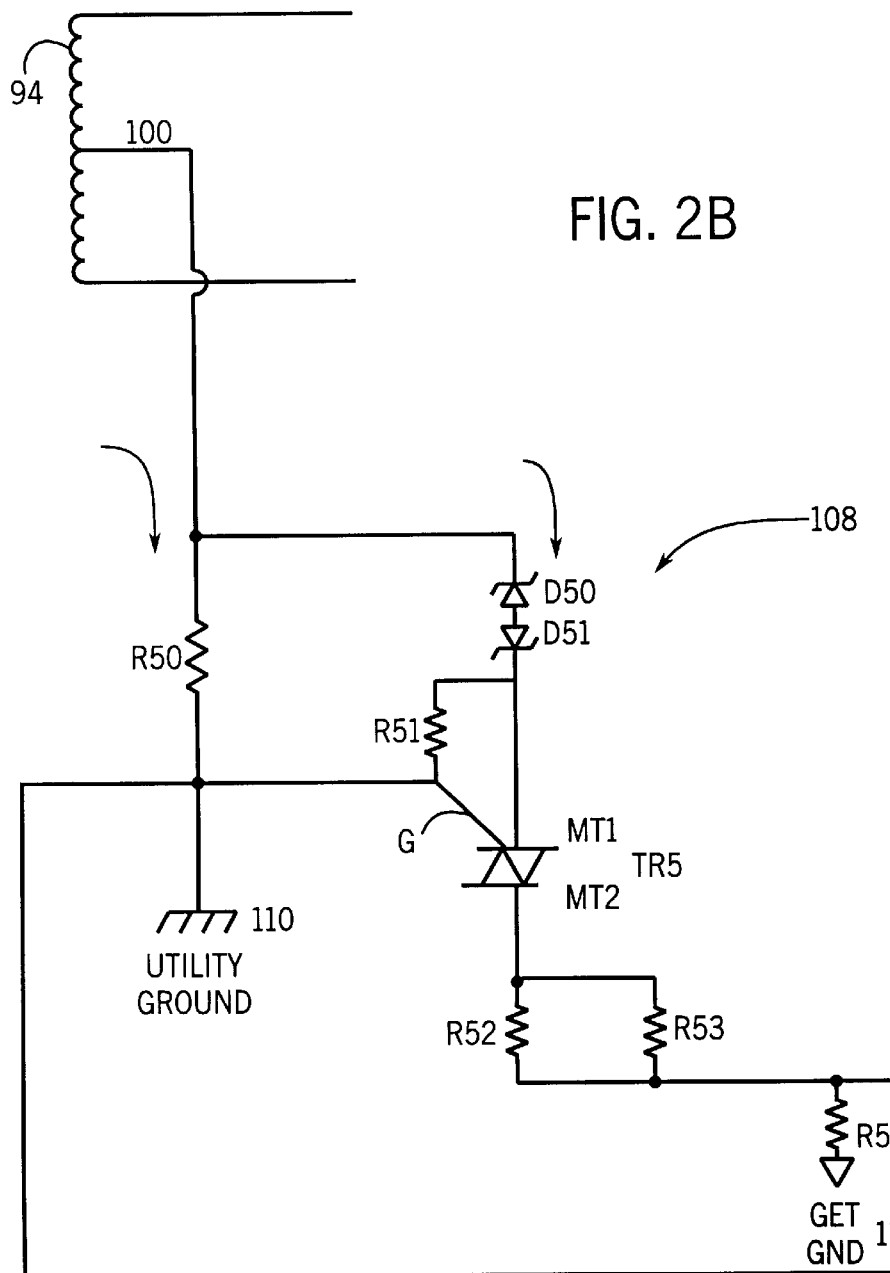
FIG. 2B is a schematic diagram of a ground fault interrupt portion of the circuit in a further embodiment of the invention.

Any current that flows through one part of the secondary winding 94 but not the other must flow in or out of the leads 102 or 104. This current flows through the ground fault detect circuit 99 (FIG. 1C), and if the predetermined threshold is reached, the microcontroller IC1 is notified of the ground fault condition. Another embodiment of the ground fault circuit 99 is depicted in FIG. 2B, and described in the accompanying text.

A current sense circuit 106 operates on a similar principle to the ground fault circuit 99. The current sense circuit 106, however, determines if current flowing through the secondary winding 94 is within a certain range of values. Some portion of the secondary common mode current must pass through the series combination of resistors R41 and R42. These two resistors form a current divider with resistor R40. The proportion of the current that flows through resistors R41 and R42 is determined by the values of resistors R40, R41, and R42. Relatively precise resistors are preferably used for all three resistors R40, R41, and R42, to give the circuit greater precision at very little cost.

As secondary current flows through resistors R41 and R42, a voltage is developed across each of these resistors. Depending on the polarity of the current, one of zener diodes D40 and D41 and one of zener diodes D42 and D43 will be forward biased, and the other will be reverse biased. If the current is low enough such that the voltage developed across the corresponding resistor R41 or R42 does not overcome the zener diode voltage of the corresponding reverse biased zener diode, nothing further happens. Resistors R43 and R44 help insure that the triacs TR3 and TR4 are not triggered into conduction by stray electromagnetic signals prior to being triggered by the appropriate transformer current.

As the resistor voltage exceeds the zener diode voltage, all further current flows through the zener diodes and the triac gate to main terminal one junction of the corresponding triac. This causes triac TR3 or TR4 to conduct. A signal is sent from triac TR3 or TR4 to a selected, available microcontroller port pin, indicating that the current has exceeded the pre-established thresholds. The signal, at OUT1 and OUT2, may be sent to an available port on microprocessor IC1, or to a separate microprocessor. In a preferred embodiment, the signal from one output will indicate whether the output current exceeds a predetermined value, and the output from the other output will indicate whether the output current is below a lower predetermined value, thereby allowing the output to be constrained within a window, or range, of values. Functionally, the current sense circuit 106 operates by detecting whether the current has exceeded the predetermined thresholds. Therefore, to hold the current within a window, one lower threshold is exceeded but another higher threshold is not.

Resistors R45 and R46 are current limiting resistors that work in conjunction with the internal clamp diodes within the microcontroller to limit the current into the microcontroller port pins. Resistors R47 and R48 pull the port pins low in the absence of an active signal from the corresponding triac. Capacitors C40 and C41 integrate the signal. The waveform produced from the transformer normally has a high crest factor, and the current will initially exceed the threshold for only a small portion of the cycle. When this occurs, capacitors C40 and C41 retain the active signal for the entire cycle. The thresholds will be set according to the expected ratio of peak to average current. This ratio is expected to remain relatively unchanged over the range of expected currents. The relatively fixed ratio allows this peak sensing circuit to be used to give an indication of average current.

The values of resistors R41 and R42 determine the current thresholds for this circuit. Normally these two resistors will have slightly different values, to give two current thresholds. These two current levels form a window for normal operation. The software may then be configured to adjust the brightness level such that the output current is within a window of values. Thus, for example, a set of multiple lamps powered by multiple power supplies will have matched brightness levels. In still another embodiment of the circuit, the lower threshold may be set sufficiently low that the current sensing circuity effectively operates as an open circuit detector.

Ground Fault Interrupt (GFI) Circuit

FIG. 2B depicts a ground fault circuit 108 that is similar to ground fault circuit 99 (FIGS. 1C and 2A). Ground fault circuit 108 is connected to center tap 100 of secondary winding 94. Center tap 100 is connected in circuit to utility ground 110 through two paths. First, the current may flow directly through R50 to utility ground 110. Second, the current may flow through zener diodes D50 and D51 and across triac TR5. When a balanced load condition exists (when the current flowing into secondary winding 94 is equal to the current flowing out of secondary winding 94), center tap 100 of the secondary 94 is at ground potential and no ground fault current flows through ground fault circuit 108 to utility ground 110.

If a ground fault condition occurs, ground fault current begins to flow through ground fault circuit 108 to utility ground 110. Initially, all of the current flows through R50, and none flows through the series combination of zener diodes D50 and D51 and triac TR5. The resistance of resistor R50 determines the voltage drop across the two parallel branches of ground fault circuit 108, for a given ground fault current. For small currents, the voltage difference across resistor R50 is insufficient to force the reverse biased zener diodes D50 and D51 into conduction. As the GFI current builds, the voltage eventually increases in magnitude until the series combination of zener diodes D50 and D51, and the gate (G) to main terminal 1 (MT1) junction of triac TR5 is forced into conduction. This triggers triac TR5 into conduction from MT1 to main terminal 2 (MT2). Because this circuit is symmetric, either polarity of ground fault current can cause triac TR5 to conduct. Both the zener diodes D50 and D51 and the triac TR5 constitute avalanche devices in which current readily flows through the avalanche device when a voltage across a specific channel in the avalanche device exceeds a specific level.

When triac TR5 conducts, a large positive voltage (with respect to circuit ground) is applied to the triac side of resistors R52 and R53. Because the ground fault circuit 108 is connected to circuit ground 110 through resistor R54, a voltage is developed at the GFI output terminal that may be used to operate a switch or may be input to a microprocessor, as shown in FIG. 1B (at port P2.1).

Adjusting the value of resistor R50 varies the trip point, and thus the sensitivity, of the ground fault circuit 108. Increasing the resistance of resistor R50 lowers the trip threshold current.

Ground fault circuit 108 prevents excessive voltage differences between center tap 100 and utility ground 120 in two ways. First, the current path across resistor R50 may reduce the voltage built up on center tap 100. Additionally, diodes D50 and D51, and the G to MT1 junction of triac TR5 effectively form a clamp that limits the peak instantaneous voltage across this circuit.

The G to MT1 voltage required to trigger a triac may vary considerably with temperature. Placing back to back zener diodes in series with this junction reduces the effect of this sensitivity on overall circuit sensitivity. The forward and reverse voltage ratings of zener diodes D50 and D51 are relatively stable in the typical operating temperature range.

In a preferred embodiment, the voltage across zener diodes D50 and D51 will be the substantial majority of the total circuit trigger voltage. Therefore, large variations in the triac trigger voltage due to temperature swings will produce a small change in the ground fault current trip point. Zener diodes D50 and 51 are also preferably chosen to be large enough to exhibit little or no leakage, because leakage could cause circuit triggering.

In prior art circuits, triacs that are triggered into conduction are typically "latched on" until the MT2 and MT1 current falls below some critical "holding current" level, is reversed, or is removed all together. Because of the relatively high values of resistors R52 and R53, this holding current level is never reached, and triac TR5 never latches ON. Rather, triac TR5 conducts from MT2 to MT1 for the period that gate current is present, and ceases to conduct when the gate current is removed. Triac TR5 continues to provide an instantaneous indication of ground fault current, and never requires "resetting".

Resistor R51 is not required, but may be included to desensitize the ground fault circuit 108 to spontaneous self triggering when below fault current trip levels.

The ground fault interrupt circuit of the invention has a number of features and advantages. Because this circuit senses instantaneous current, it is inherently very fast to respond to a fault condition. The response speed is limited only by the downstream circuitry which receives the fault signal from this circuit. If the downstream circuitry is a microcontroller that is also controlling the output waveform, then the output can be instantaneously stopped. Circuits that use a filter approach to detect the GFI condition are typically much slower in response. The response of ground fault circuit 108 can be altered by the software of the microprocessor controller.

Also, because this circuit is direct sensing, it is not frequency sensitive. It responds equally well to ground fault currents at 22 kHz, 60 Hz, or to direct current.

Further, ground fault circuit 108 is designed to be "fail safe" in the event of a component failure. If resistor R50 opens (the normal failure mode for a resistor), then the circuit sensitivity will greatly increase, giving an indication of a ground fault condition with very little ground fault current. Similarly, a short in either zener diodes D50 or D51 (the normal failure mode for a semiconductor) will cause a very large increase in circuit sensitivity. If triac TR5 shorts, it will cause a permanent indication of a fault condition. If resistor R51 opens, the circuit will probably function normally. If the circuit does not, it will probably cause a false fault indication and cause a shutdown. If the resistor R54 opens, the circuit will either operate normally or give a false fault indication (causing a circuit shutdown).

If resistor R52 opens, and resistor R53 is not present, the circuit would permanently indicate a no-fault condition. For this reason, second parallel resistor R53 was added. The circuit will function normally (with no change in function) with either or both resistors intact. Thus, in the event of failure of any individual component according to the normal failure mode, ground fault circuit 108 will either continue to operate normally or indicate a ground fault.

In the case in which the power supply does not have a direct ground connection with the utility (caused by, for example, the lack of a ground prong in the outlet), a ground network 116 may be connected to ground fault circuit 108 in place of, or in addition to, utility ground 110. Some grounding of the power supply is necessary for operation of the ground fault circuit 108. Of course, if there is no ground connection, then no ground continuity detecting circuit can be used.

Ground network 116 is connected in circuit to the hot and neutral lines L1 and N from the utility, and also connected in circuit to the high voltage supply line L5 and the circuit ground line L3. These lines are also shown as the input and output lines to the input power conditioning portion 50 of the power supply (FIG. 1A). The lines will be grounded through parasitic capacitances at the utility, thus completing the ground circuit. Rectifier diodes D52 and D53 form a half bridge rectifier. Capacitors C50 and C51 are relatively large electrolytic capacitors. Resistors R55 and R56 have a relatively high and equal resistance, to reduce power dissipation and force the node between them to the midpoint of the voltage between the two supply lines L3 and L5. Capacitors C3 and C4 are selected to be a low impedance at the operating frequency of the power supply. A value of 0.01 μFd is preferably chosen for an operating frequency of about 20 KHz.

Ground Continuity Detector

The object of a ground continuity detector is detecting continuity of the circuit from ground in the power supply (chassis ground) back to the ground in the utility (earth ground). Such a discontinuity may be caused by, for example, a broken or removed ground prong of an outlet plug.

FIG. 1A shows the input power conditioning portion 50 of the circuit. As shown in FIG. 1A, regardless of the input power type, the circuit lines L3, L4 and L5 are at voltage of zero, 170, and 340 volts relative to the circuit ground. Because line L4 is substantially at utility ground (earth ground) potential, circuit ground is a high magnitude, substantially constant negative voltage relative to earth ground. Using line L3 (the −170 volt rail) as "circuit ground" simplifies system design, as all signals are then positive with respect to circuit ground. Stated another way, utility ground in a properly functioning unit has a potential approximately 170 volts positive with respect to circuit ground.

Figure 2C:
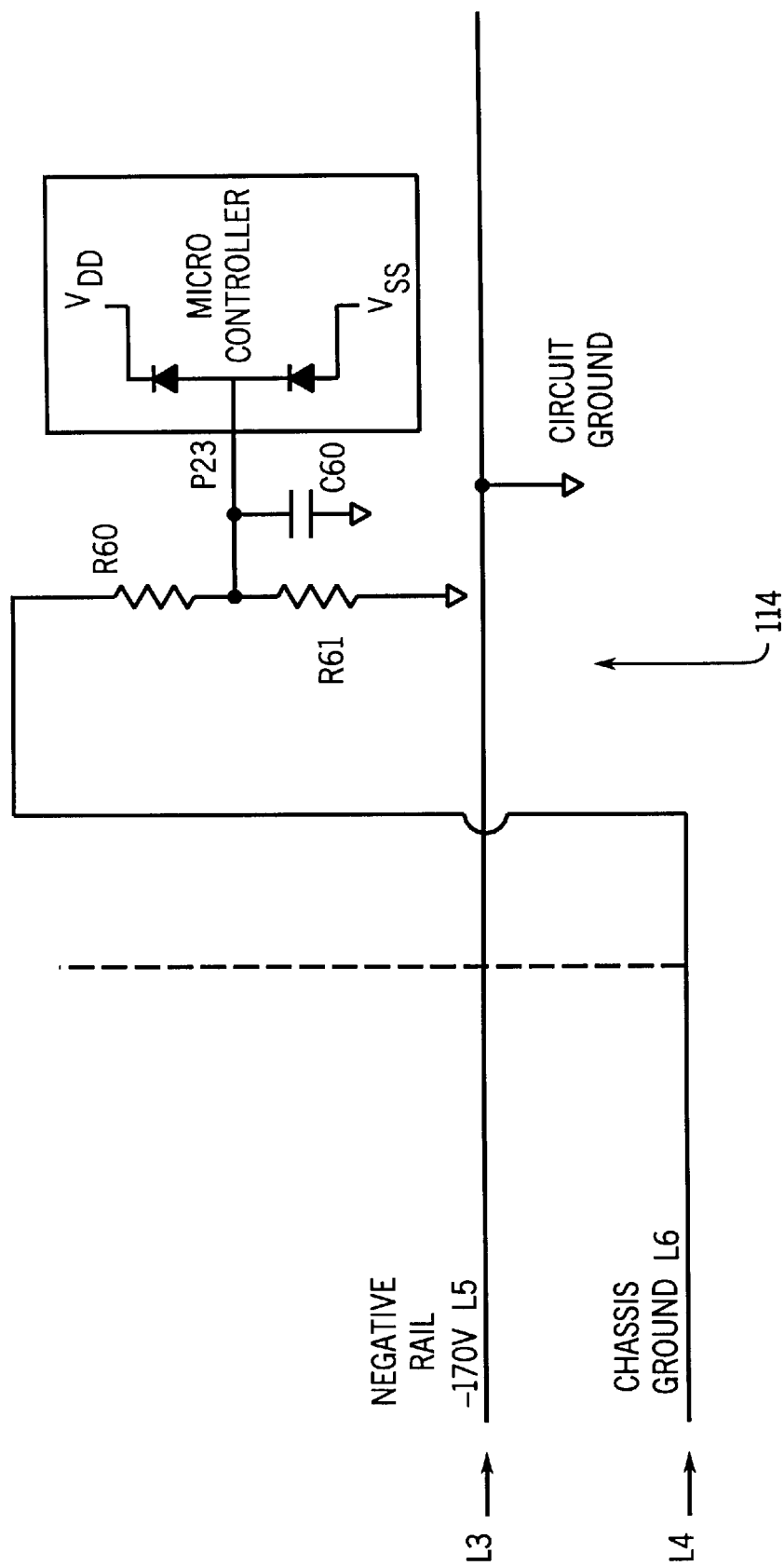
FIG. 2C is a schematic diagram of a ground continuity detection portion of the circuit in a further embodiment of the invention.

FIG. 2C depicts a ground continuity detector circuit 114 according to the invention. The ground continuity detector 114 is also shown in simpler form in FIG. 1B, and comprising resistors R6 and R7 connected to port P2.3 of microprocessor IC1.

The ground continuity detector 114 (FIG. 2C) detects the presence of this large, substantially constant voltage difference with a microcontroller port pin. The signal is connected to the microcontroller via a relatively high value resistor R60. The current from utility ground, through chassis ground line L6 and through resistor R60 will keep port P2.3 at a logic high level, indicating a safe condition. If, however, the continuity of the utility ground path through chassis ground line L6 is broken (for example, because of a broken power cord ground pin), the microcontroller port pin will be pulled low by resistor R61. This indicates a fault condition, and the microcontroller will shut down the unit by stopping the output drive sequence. For example, in a preferred embodiment, resistors R60 and R61 are rated at 1 MΩ and 100 kΩ, respectively, and the value of the voltage trip setpoint (on the chassis ground line L6) is approximately 27 volts. Therefore, if the voltage difference between circuit ground and utility ground drops from 170 to below about 27 volts, then the ground continuity circuit is triggered. The selection of the voltage trip setpoint is somewhat arbitrary and other trip setpoints are possible.

The ratio of resistors R60 and R61 determines the voltage trip setpoint. Capacitor C60 reduces the sensitivity of ground continuity circuit 114 to any transient signals that may be present on the utility line.

A significant advantage the present invention is that ground continuity detector 114 operates by detecting the change in a substantial voltage. Typically, prior art ground continuity detectors operate by detecting a voltage difference between the neutral line on the utility (utility ground) and chassis ground. Such a difference is significantly smaller, and therefore the circuitry required is more complex, expensive or ineffective.

A preferred microcontroller for this circuit includes built in clamp diodes. This simplifies the external circuitry because no external clamping circuitry is needed to protect the microcontroller's input port pin from the high voltage being sensed. The microcontroller may, of course, be substituted by discrete components such as transistors or logic gates.

As a benefit of the circuit configuration of the ground continuity circuit 114, the components should all be very reliable and the ground current drawn from the utility by this circuit is very small. This current may be further reduced by increasing the value of resistor R60.

Further, the ground continuity circuit 114 is "fail safe." If resistor R60 opens, the circuit 114 will detect a fault and shut down. If resistor R61 opens, the circuit 114 would probably not detect a fault condition (this depends upon the input leakage characteristics of the microcontroller port pin). If this is a concern, parallel resistors may be used for redundancy. If capacitor C60 opens, the circuit will likely operate as normal, or at worst, the power supply may shut down. Thus, in any event, the ground continuity circuit 114 fails safely.

Low Voltage Power Supply

As another possible alternative configuration of the power supply 10 (FIG. 1), a supplemental power supply may be configured to power the low power components, such as the microprocessor IC1 and the MOSFET driver IC2 or IC3. As depicted, the bias supply dropping resistors R3 and R4 shown in FIG. 1A will generate a significant amount of heat even with small currents drawn by the 15 VDC and 5 VDC power sources (approximately 1.25 watts total with values of 39 kΩ). In order to reduce the internal case heating caused by these resistors, it is possible to derive all or part of the power required by the low voltage circuitry from a charge pump or other low voltage power supply drawn directly from the power line input (not shown), or from a battery. Alternately, it is possible to draw a small startup current from resistors R3 and R4 and derive the majority of the low voltage power supply current from a charge pump connected to the drive output at the junction of MOSFETS Q3 and Q4. Such a low voltage power supply should provide power to the microprocessor immediately upon startup in order to control the switching circuit appropriately.

Power Factor Correction

As a further alternate embodiment, it may be preferable to include power factor correction circuitry in the lamp power supply 10. For example, the circuit may be broken across the electrolytic capacitors C5 and C6 by jumpers J2 and J5, and a standard power factor correction circuit may be installed. An appropriate power factor correction circuit topology is shown in the *Discrete Power Semiconductor Handbook*, published in 1995 by SGS-Thompson Microelectronics, on page 370, incorporated by reference herein. The boost configuration shown may be used with a microcontroller, or power factor control integrated circuit, to control the gate switching, as is well known in the art.

Other

The IR2101 8 pin MOSFET driver family contains two other family members which differ only in the polarity of the input signals. These devices could be used with changes in the microprocessor code to reflect the change in polarity, and a corresponding change in the cross conduct inhibit circuit used to prevent turning both MOSFETs ON simultaneously. The 14 pin MOSFET drivers, specifically the IR2110 or IR2112, may also be used in the circuit.

Finally, the polarity of the light LED 1 (FIG. 1B) could be swapped, with LED bias resistor R5 tied instead to ground. The LED drive polarity within the code would then have to be swapped. Either polarity works fine with the Zilog microprocessor, since it has fairly strong drive signals for both high and low outputs. However, the output low drive is slightly stronger, so the preferred embodiment uses output low on port P2.5 to drive LED1. On many other microprocessors, output high is a very weak drive as compared to output low, so output low would be preferred.

SOFTWARE

Reset and Initialization

Figure 3A:
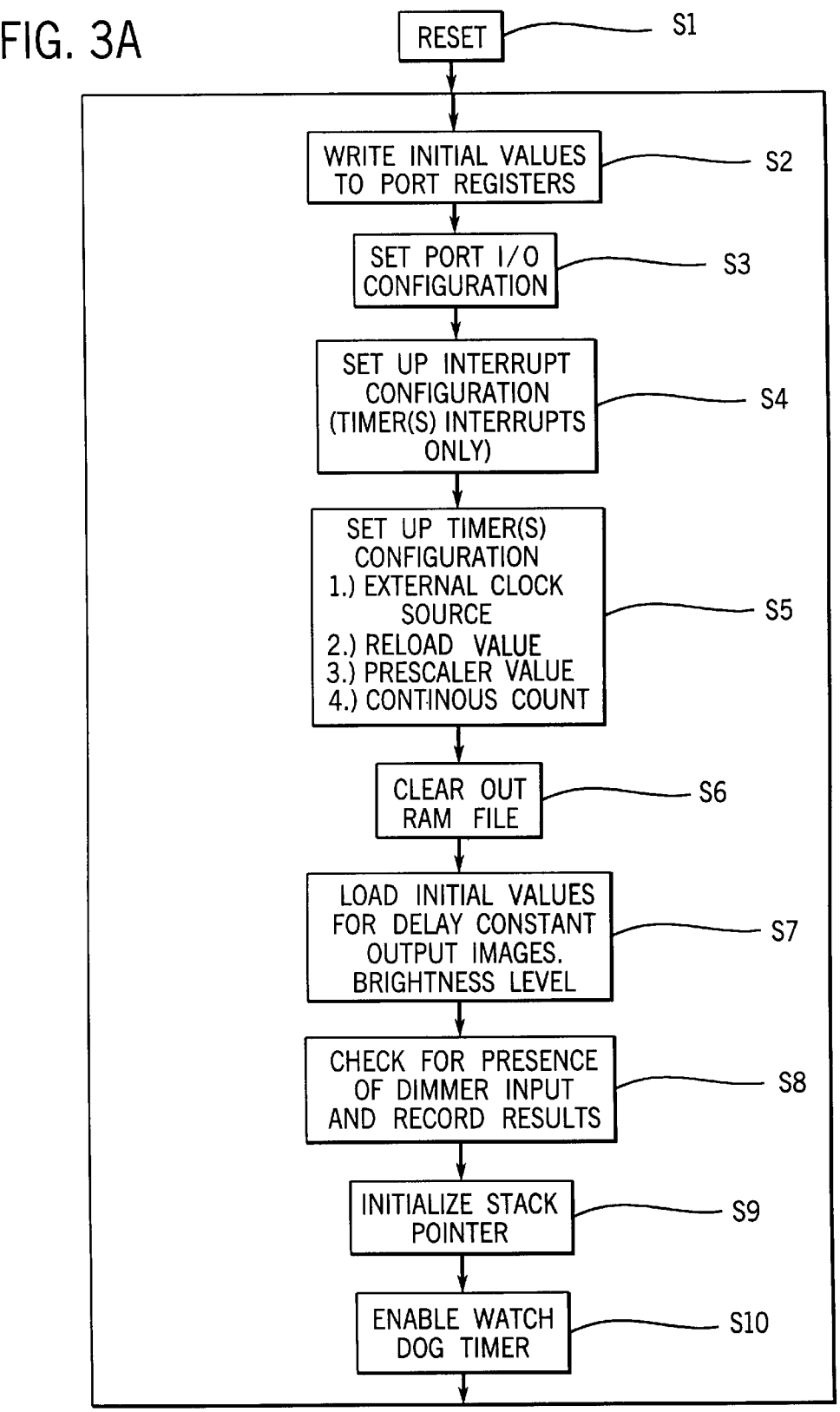
FIGS. 3A though 3E are flow chart diagrams of the software used to operate the microprocessor of FIG. 1B.

Referring to FIG. 3A, when the power supply rises through approximately 3 volts, the internal reset circuitry within Zilog Z86C02/04/08 microprocessor IC1 generates a device reset at step S1. This is the normal mode of reset on power up as microprocessor IC1 does not have a reset pin.

After the reset sequence is completed, the initialization sequence is performed. First, the ports are configured. At step S2, initial values are written to port registers and at step S3 the port input/output configuration is set. Next, the timer interrupts are configured at step S4 and the timers are configured at step S5. The circuit may operate without the timers, or the timers may be used to create, for example, special effects. Random Access Memory (RAM) is then cleared at step S6. The microprocessor then loads initial values at step S7, checks for the presence of the dimmer input device module potentiometer 65 (FIG. 1B) at step S8, initializes the stack pointer at step S9, and enables the watch dog timer at step S10.

Normal Operation

Figure 3B:
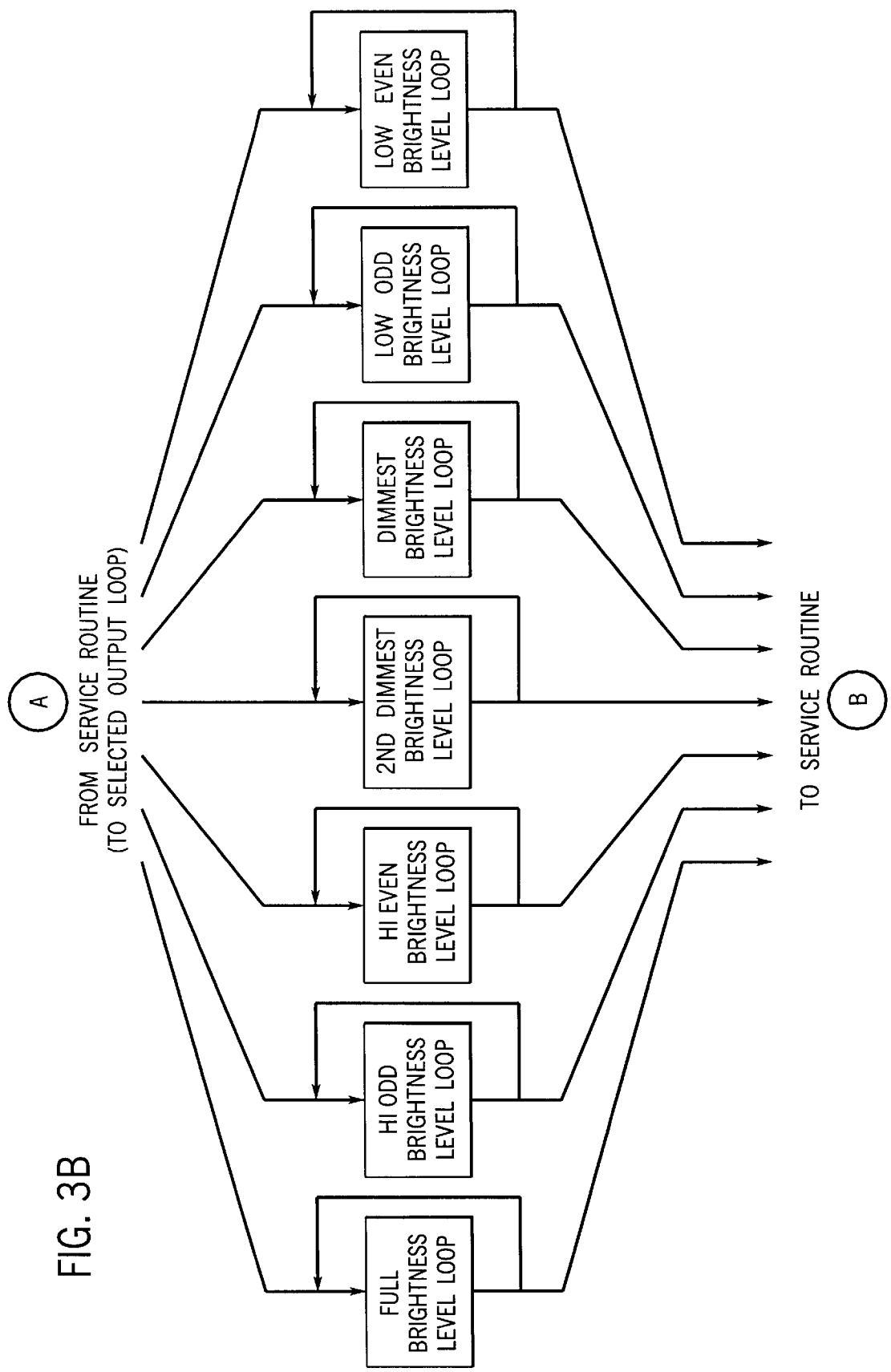

As shown in FIG. 3B, after initialization, the software jumps to one of the output loops. In a preferred embodiment, seven separate loops provide the same function—to provide precise timing signals to the MOSFET driver in a pattern determined by one of the selected brightness levels.

As shown in FIG. 3B, seven separate output loops may be used to resolve timing and resolution limitations of the inexpensive Zilog Z86C02/04 microprocessor. One loop handles the full brightness level, one loop handles the minimum brightness level, and five other loops handle intermediate brightness levels. Such intermediate brightness levels for separate loops may be, for example, a second minimum brightness level loop, a brighter even brightness levels (2,4,6) loop, a brighter odd brightness levels (1,3,5) loop, a dimmer even brightness levels (8,10) loop, and a dimmer odd brightness levels (7,9) loop.

Figures 4A, 4B:
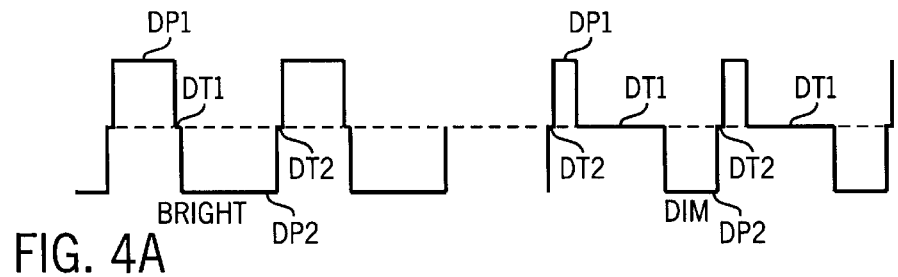
FIG. 4A is a timing diagram of the output signal of the preferred lamp power supply showing signal modulation for relative bright and dim states.
FIG. 4B is a table of representative values of times for different brightness levels of the signal modulation scheme of FIG. 4A.

The level numbers correspond to brightness levels in the table in FIG. 4B, which is an example of times for the various periods of drive pulses and dead times at different brightness levels. The sample times in FIG. 4B relate to the sample waveforms shown in FIG. 4A, described hereinafter in further detail. The loop for the dimmest output is normally the starting point.

The output loops provide the switch timing for a particular drive scheme. In normal operation of the software, the software performs several tasks periodically. The software cycles through the output loop at discrete, relatively short time intervals. Also, the software cycles through a service routine, as described hereinafter. If a fault is found by the service routine, the software vectors to a fault routine.

Drive Scheme

The implementation of the software of the present invention may depend upon the particular drive scheme.

Therefore, a preferred drive scheme is described herein, and a particular software implementation is subsequently described. It shall be understood that this constitutes a preferred embodiment only, and that the principles of the present invention may be applied toward other drive schemes.

Figure 4C:
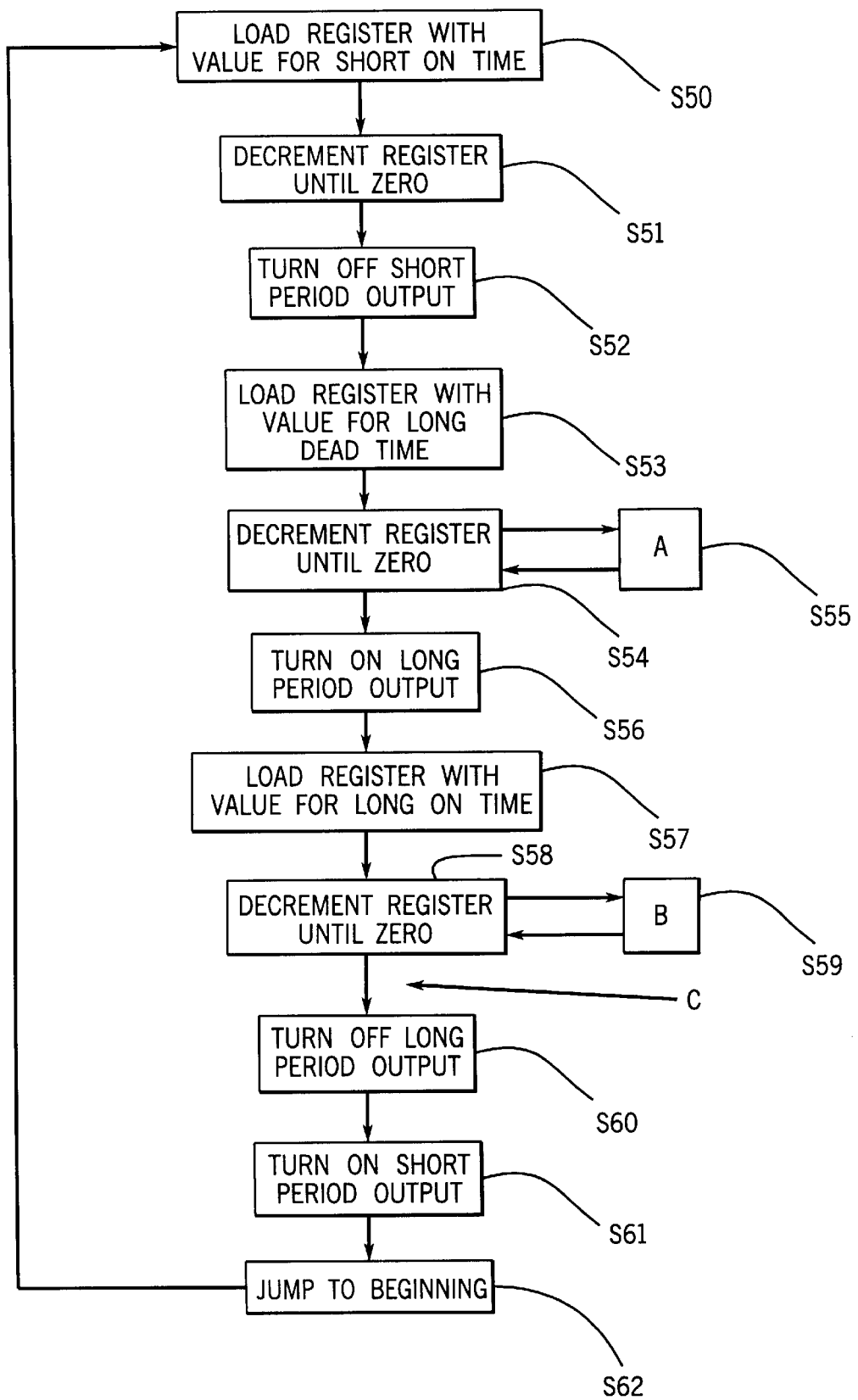
FIG. 4C is a flow chart diagram of the output loop of the software used to implement the signal modulation scheme of FIG. 4A.

FIGS. 4A, 4B, and 4C relate to a drive scheme for a preferred embodiment of the present invention relating to a particular output signal varying scheme. Drive pulses may be typically referred to as the ON time or duty cycle of the signal. As shown in FIG. 4A, this particular dimming scheme comprises a relatively short first drive pulse DP1, followed by a long variable first dead time DT1, followed by a relatively long second drive pulse DP2, followed by a fixed, short second dead time DT2. Both first and second drive pulses DP1 and DP2 are varied in length in constant ratios, with second drive pulse DP2 twice as long as first drive pulse DP1, and the frequency is fixed over the dimming range.

FIG. 4B shows representative times in microseconds of the four periods DP1, DT1, DP2, and DT2, as the brightness level is decreased through 17 levels from full brightness at 0 to full off at 16. The first column, "Second Drive Pulse," corresponds to the length of second drive pulse DP2. The second column, "Second Dead Time," corresponds to the length of second dead time DT2. The third column, "First Drive Pulse," corresponds to the length of first drive pulse DP1. Last, the fourth column, "First Dead Time," corresponds to the length of first dead time DT1.

The total period of the cycle is 50 microseconds, for a frequency of 20,000 hertz, which is on the limits of the normal range of human hearing. The ratio of the long ON time to the short ON time remains fixed at 2 to 1 at all brightness levels. As indicated in FIG. 4B, dimming levels 13 through 16 are difficult to implement in software, and are too dim to use, and are therefore, not used.

The minimum dead time of 1 microsecond is chosen to ensure that both MOSFETs never simultaneously conduct, and may vary based upon which MOSFETs and driver circuitry is used. If a faster microprocessor is used, additional resolution in brightness steps may be possible, and fewer output loops (than shown in FIG. 3B) may be required.

FIG. 4C depicts a block diagram of the software implementation of this preferred drive scheme. More particularly, FIG. 4C depicts a single drive cycle loop with calls to the service routine. The particular drive cycle routine is implemented in cooperation with the service routine. This may be accomplished in several ways. First, a counter could be used to track the number of drive cycles that are performed and at regular intervals, such as every 100 drive cycles, the software could vector to the service routine. When the service routine is complete, program flow is returned to the output loop. However, the drive signal must remain almost unchanged throughout the service routine, or else an audible noise will be produced at the service routine rate of, in this case, about 200 hertz. Therefore, the output drive statements and the normal service routine statements should be carefully interlaced. Second, the service routine may be executed in small segments during the long individual phases (output or dead time) of the waveform. This is shown as A and B, steps S55 and S59 in FIG. 4C. Again, careful timing may be required.

In FIG. 4C, the program first loads a register with the value for a short ON time (corresponding to first drive pulse DP1) at step S50. Then, the register counts down to zero at step S51 and the short ON period output is turned off at step S52. Next, the program loads a register with the value for a long dead time (corresponding to first dead time DT1) at step S53, then decrements the register to zero at step S54 to effect the first dead time. As previously discussed, the program may vector to a segment of the service routine A at step S55 during this dead time and return. Subsequently, the program turns on the long ON period output (corresponding to second drive pulse DP2) at step S56, loads the register with the value for the long ON time at step S57, and decrements the register to zero at step S58. Again, the program may vector to the service routine segment B at step S59 and return while the register at S58 decrements to zero. In actual practice, it may not be possible to execute a register decrement while executing the service routine at the same time. Nevertheless, the program effectively performs the function because the value loaded in the register is decreased by the amount of time the code will be executing the service routine. In a preferred embodiment, the time to execute the service routine has been fixed for various brightness levels, and therefore the register decrement may also be a fixed value. At step S60, the program turns off the long ON period output, and then turns on the short period output at step S61. At C, between step S60 and step S61, the 1 microsecond dead time (corresponding to second dead time DT1) is performed without an individual register because the clock of the microprocessor will otherwise generate a step of that duration due to its clock speed. If a faster processor is used, then a dedicated program sequence may be necessary. Finally, at step S62, the program jumps back to the beginning, step S50, to perform the output loop again.

In practice, separate output loops are required for brightness levels that have one very short phase, since there is insufficient time to load and decrement a count down register. For example, the full intensity level has a second dead time of only one microsecond. Therefore, a number of separate brightness output loops are required, as shown in FIG. 3B.

Referring again the output drive scheme of FIGS. 4A, 4B, and 4C, the output loop may vector to the service routine during whichever portion of the output signal is longest (in this case, either first dead time DT1 or second drive pulse DP2) and execute a small segment of the service routine before executing the next portion (either second drive pulse DP2 or second dead time DT2, respectively) of the output waveform. The service routine, as described hereinafter, may then be divided into approximately 20 segments. For example, if the brightness levels are set according to the table in FIG. 4B, then the service routine is called during the long ON time (second drive pulse DP2) in brightness levels 0 through 6 (corresponding to B at step S59) and the service routine is called during the long dead time (first dead time DT1) in brightness levels 7 though 12 (corresponding to A at step S55).

Figure 5:
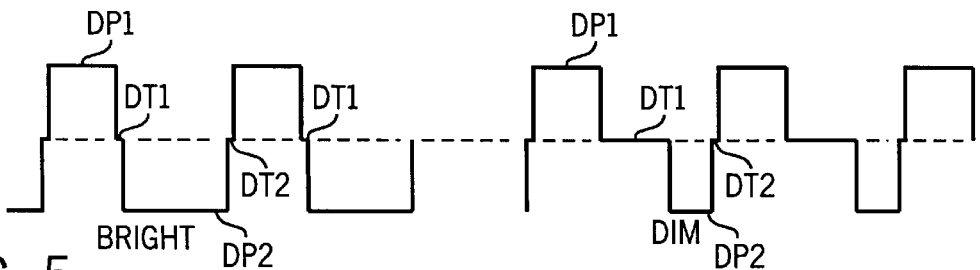
FIG. 5 is a timing diagram of the output signal for another embodiment of the lamp power supply showing signal modulation for relative bright and dim states.

FIG. 5 shows a different output waveform that could be driven by the program loop of FIG. 4C. In FIG. 5, the first drive pulse DP1 is fixed, the first dead time DT1 is variable, the second drive pulse DP2 is variable, and the second dead time DT2 is fixed.

Figure 6A:
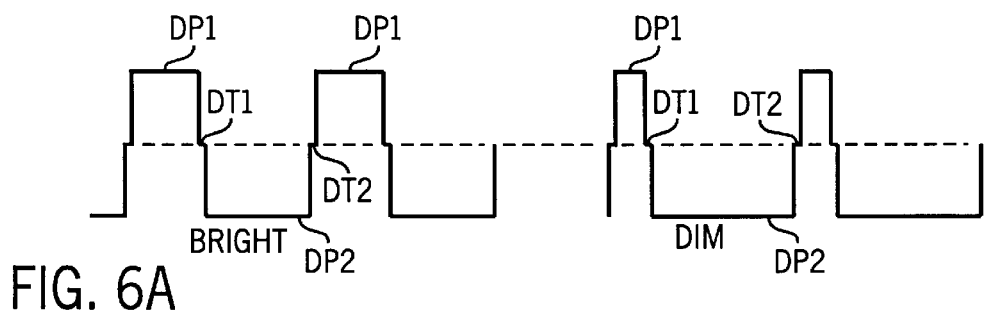
FIG. 6A is a timing diagram of the output signal for another embodiment of the lamp power supply showing signal modulation for relative bright and dim states.
Figure 6B:
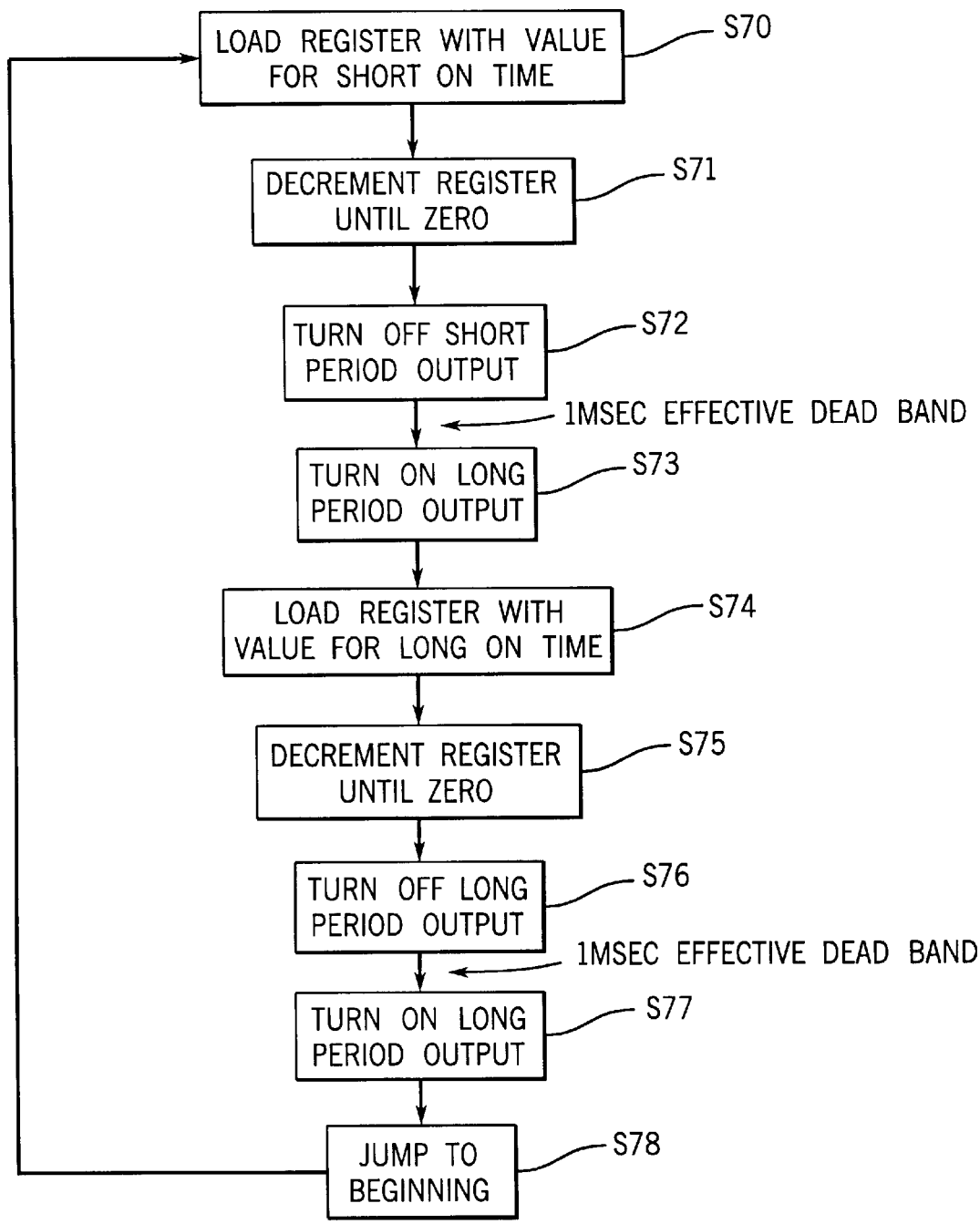
FIG. 6B is a flow chart diagram of the output loop of the software used to implement the signal modulation scheme of FIG. 6A.

FIG. 6A shows a different output waveform that may be driven by the program loop of FIG. 6B. In the waveform of FIG. 6A, the first and second dead times DT1 and DT2 are fixed and equal to each other, but the drive pulses DP1 and DP2 are both modulated.

Referring to FIG. 6B, an output loop is depicted in which dead times DT1 and DT2 are fixed at one microsecond and relatively short and occur between steps S72 and S73 and between steps S76 and S77, and also in which a variable first drive pulse DP1 occurs between the steps S77 and S72 and a variable second drive pulse DP2 is performed between steps S73 and S76. In the output loop, the program first loads a register with a value for a short ON time, or drive pulse, at step S70. At step S71, the program then decrements the register to zero, and proceeds to step S72, where the program turns off the short period output. At step S73, the program turns on a long period output, at step S74 loads a register with a value for a long ON time or drive pulse, at step S75 decrements a register to zero, and finally at step S76 turns off a long period output. After a second dead time between steps S76 and S77, the program then turns on a long period output. At step S78, the program jumps back to step S70 to run the output loop again.

Figure 7A:
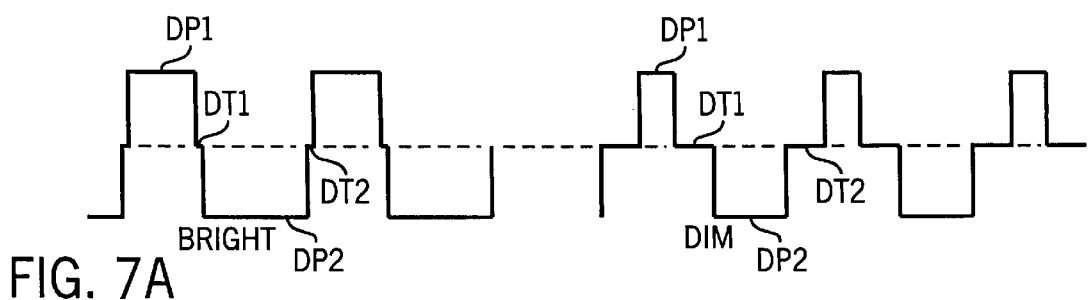
FIG. 7A is a timing diagram of the output signal for another embodiment of the lamp power supply showing signal modulation for relative bright and dim states.
Figure 7B:
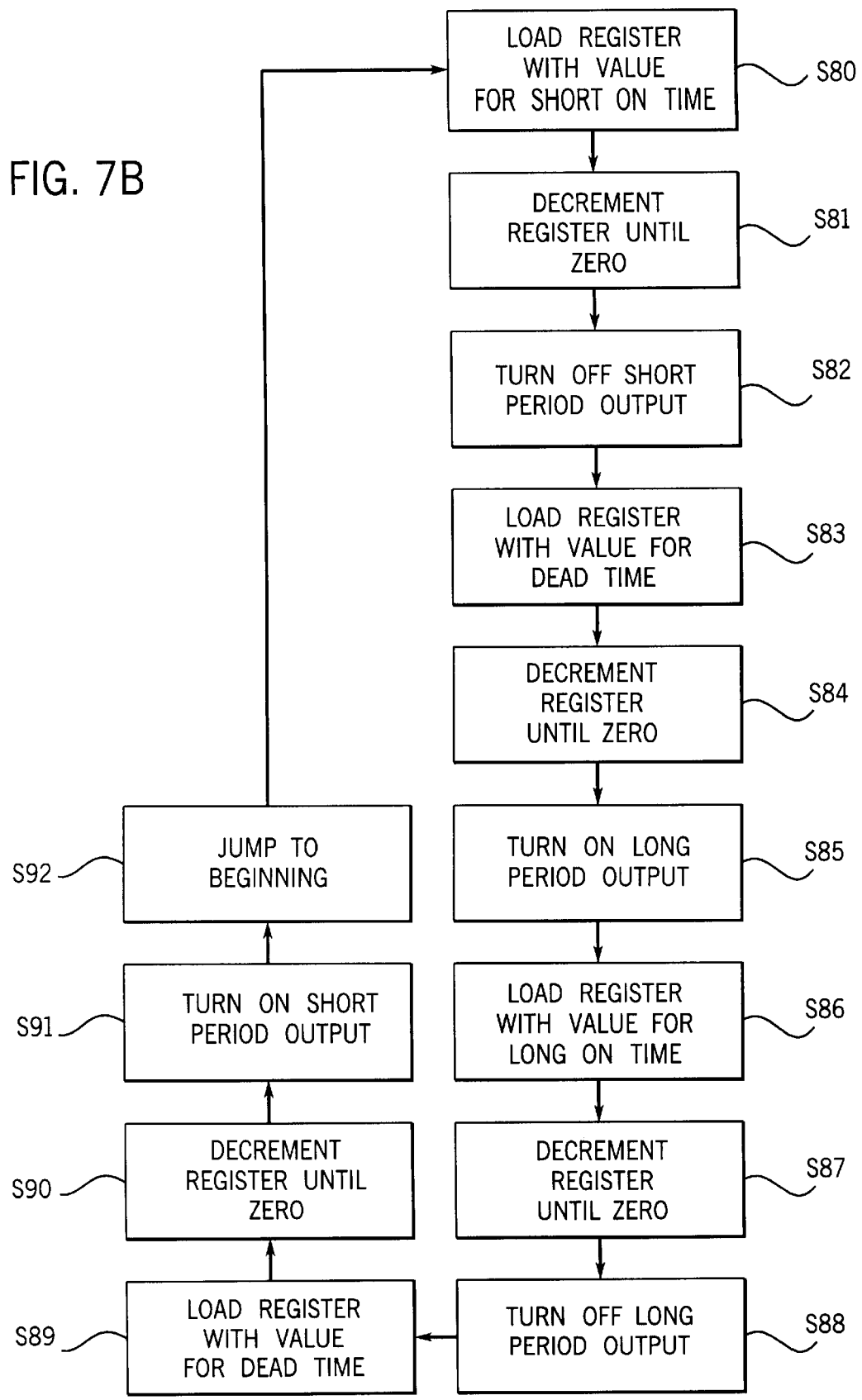
FIG. 7B is a flow chart diagram of the output loop of the software used to implement the signal modulation scheme of FIG. 7A.

FIG. 7A shows a different output waveform that may be driven by the program loop of FIG. 7B. In the waveform of FIG. 7B, the dead times DT1 and DT2 are variable but equal, while the drive pulses DP1 and DP2 are variable but in a fixed ratio.

The program loop in FIG. 7B may be implemented in an output drive scheme in which both dead bands DT1 and DT2 are variable and drive pulses DP1 and DP2 are variable. In the output loop, the program first loads a register with a value for a short ON time or drive pulse at step S80. Next, at step S81, the program decrements a register to zero and at step S82 turns off the short period output. At step S83, the program loads a register with a value for a dead time. At step S84, the program decrements a register to zero. At step S85, the program turns on a long period output. At step S86, the program again loads a register with a value for a long ON time. At step S87, the program decrements that register to zero. At step S88, the program turns off a long period output. At step S89, the program loads a register with a value for another dead time. Then at step S90, the program decrements the register to zero. At step S91, the program turns on a short period output. At step S92, the program jumps back to step S80 to repeat this output loop.

The frequency of the waveforms depicted in FIGS. 4A, 5, 6A, and 7A is fixed. In another embodiment of the present invention, it may be possible to vary the length of at least one of the dead times DT1 and DT2 and vary the frequency of the drive pulses DP1 and DP2, and dead times DT1 and DT2, to set the brightness level of a lamp.

In this way, the drive schemes shown in FIGS. 4A, 5, and 7A all illustrate how the power supply 10 of the present invention may be used to control the switching of the first and second switches to set the brightness level of the lamp by varying the length of one or both of the dead times DT1 or DT2.

For example, in the drive scheme of FIG. 4A, the switch control signals set the second drive pulse DP2 longer than the first drive pulse DP1. The second dead time DT2 is fixed and shorter than the first dead time DT1. Also, the first and second switch control signals set the first drive pulse DP1 at a fixed ratio to the second drive pulse DP2. The overall frequency of the drive scheme is fixed at a constant value.

In the drive scheme of FIG. 5, the switch control signals set the first drive pulse DP1 at a constant period and the second drive pulse DP2 varies but is shorter than first drive pulse DP1. The second dead time DT2 is fixed. First dead time DT1 is variable and longer than second dead time DT2.

In the drive scheme of FIG. 7A, the power supply controls the switches such that both the first dead time DT1 and the second dead time DT2 are changed in response to a brightness control signal. Further, the first dead time DT1 is equal to the second dead time DT2 and different brightness level settings. Also, the first and second switch control signals set the first drive pulse DP1 at a fixed ratio to the second drive pulse DP2.

The drive scheme of 6A illustrates an example of how the power supply 10 of the present invention may be used to control a switch control circuit to set the brightness level of a lamp by varying the ratio of the times of the first and second switches in response to a brightness control signal, thereby setting the ratio of first drive pulse DP1 to second drive pulse DP2. In the drive scheme shown in FIG. 6A, the dead times are fixed and short, but one or both of the dead times may be varied.

In such a manner, a method for changing the brightness level may also be provided in which a first switch is applied for a first period to apply a first voltage signal of a first magnitude, a second switch is applied for a second period to apply a second voltage signal of a second magnitude, and the ratio of the first period and the second period is varied in response to a brightness control signal. It is further possible to vary the frequencies of first and second switch activation, or the first and second magnitudes.

It should be appreciated that by controlling the power supply output signal with a microprocessor, many variations of dimming schemes are possible according to the present invention.

The Service Routine

Figure 3C:
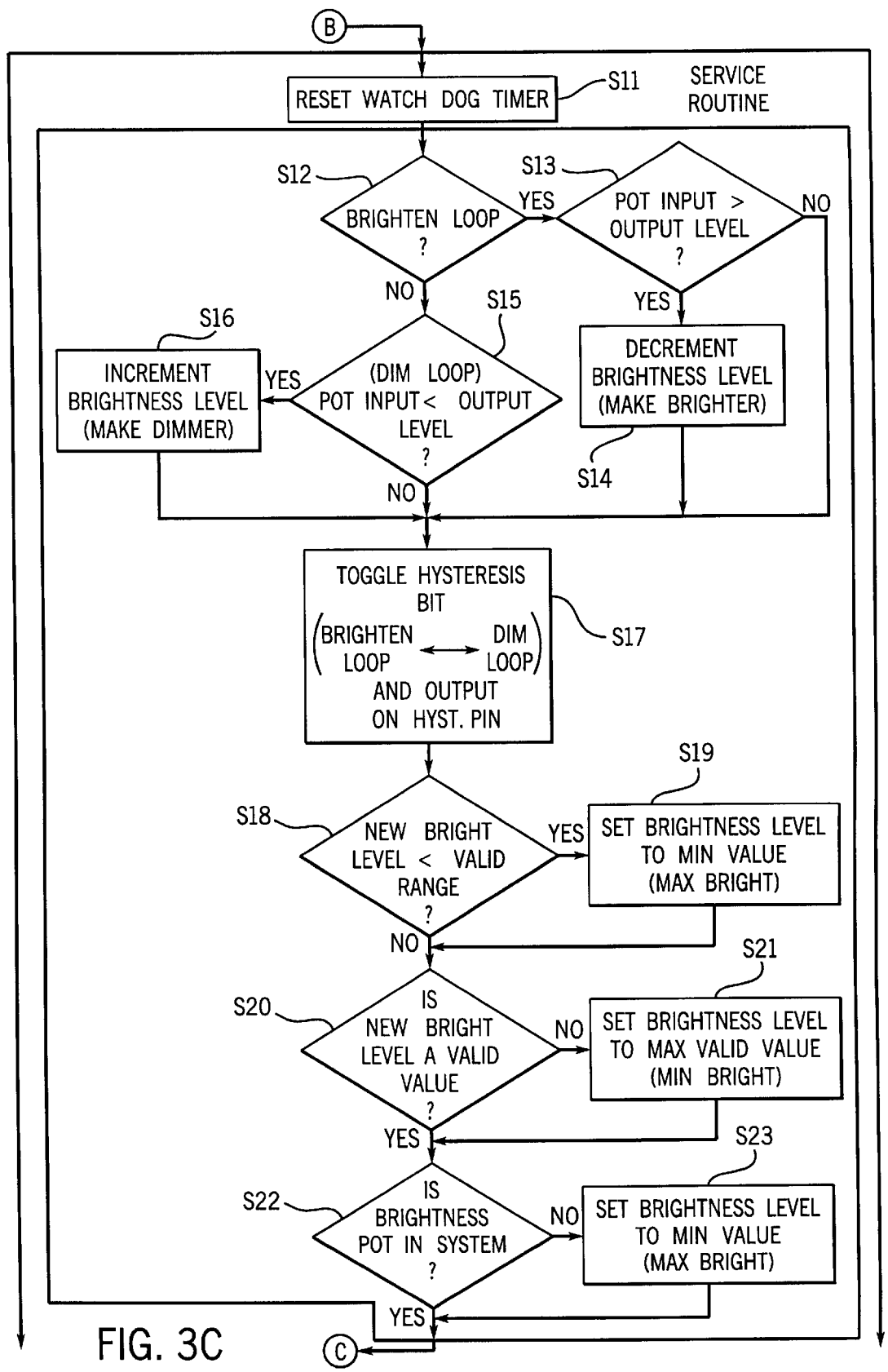

As shown in FIG. 3C, the watch dog timer are reset at step S11 as the first step of the service routine. Next, the setting of the potentiometer is checked against the current drive brightness level, to see if the level should be changed. At step S12 the program checks to see if the brighten loop should be performed, based upon the setting of the hysteresis bit. If the answer is "Yes", then the program proceeds to step S13 where the program checks if the potentiometer input is greater than the output level. If the answer is "Yes", the program proceeds to step S14 where the brightness level is decremented to make the light brighter. If the answer at step S13 is "No", the program proceeds to step S17. If the answer at step S12 is "Yes", then at step S15 the program checks if the potentiometer input is less than the output level. If the answer is "Yes", then the program increments the brightness level to make the lamp dimmer. If the answer is "No", then the program proceeds to step S17. The brightness level is checked for needed increases and needed decreases on alternate passes through the service routine.

In order to keep the brightness setting from bouncing between two adjacent levels, a hysteresis output bit is toggled at step S17. The hysteresis output bit is set high at the end of the dimming check service routine (for use in the following brightening check service routine), and set low at the end of the brightening check service routines (for use in the following dimming check routine). If it is determined that the brightness level needs to be adjusted, the brightness level register is incremented or decremented as needed.

At step S18 the program checks to see if the new brightness level is valid by checking if the brightness level is below a valid range of values. An example of a brightness level table is shown if FIG. 4B, wherein brightness level values and actual brightness setting of the lamp vary inversely. If the answer is "Yes", then the program proceeds to set the brightness level to the minimum value (for maximum brightness)at step S19. If the answer is "No", then the program proceeds to step S20. At step S20, the program again checks to see if the new brightness level is a valid value. If the answer is "No", the program sets the brightness value to the maximum valid value at step S21 (for minimum brightness). At step S22, the program checks whether the brightness potentiometer is in the system. If the answer is "No", the program at step S23 sets the brightness level to the minimum value (for maximum brightness).

Figure 3D:
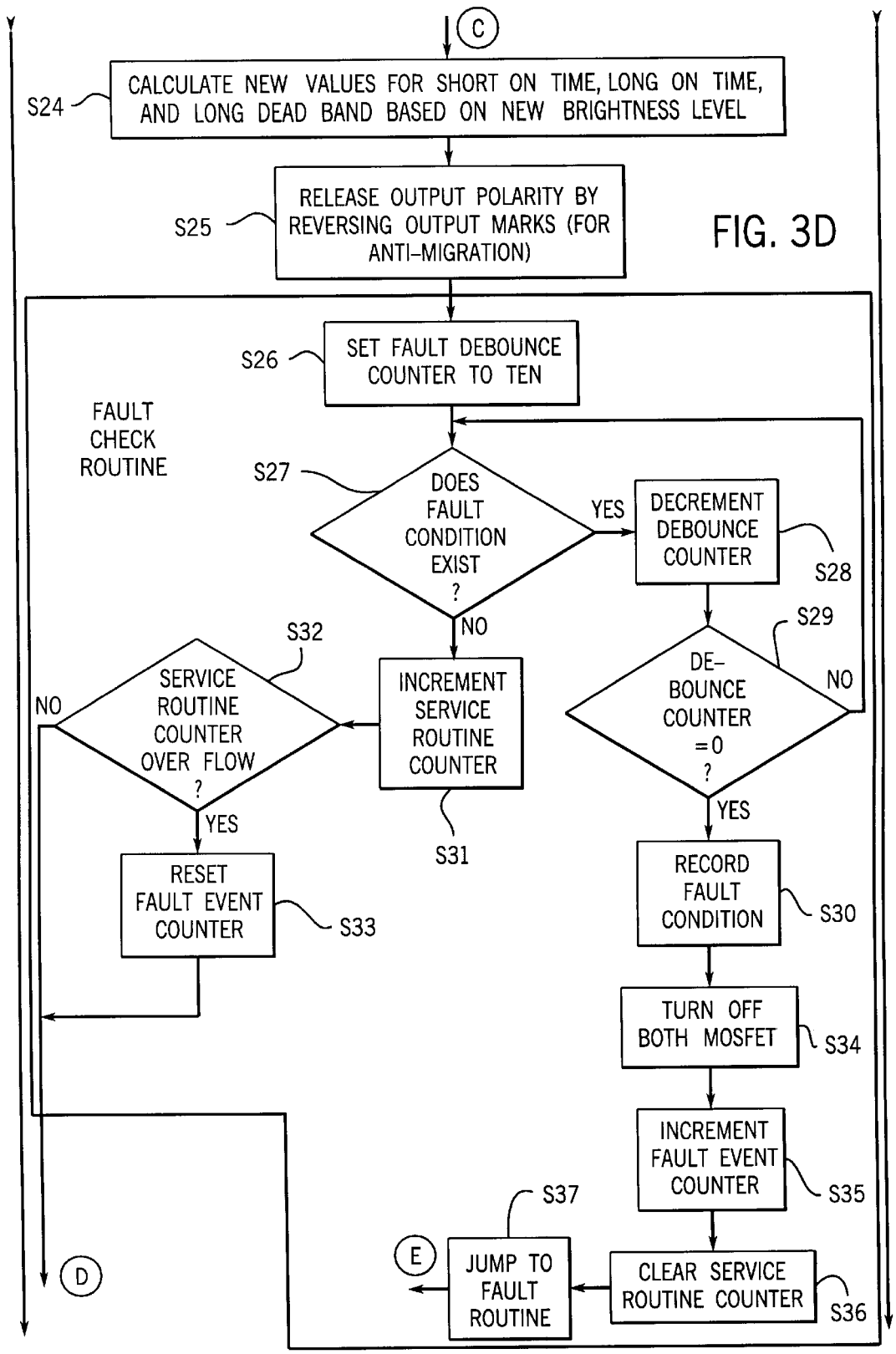

As shown in FIG. 3D, new values for the individual portions of the drive waveform are then calculated at step S24. In a preferred embodiment, the values are calculated using an algorithm, which takes less code space than if the values are stored in a look up table. In order that all of these values (brightness level, long dead time, long on time, and short on time) can be changed during one service routine segment, they are all calculated using background storage RAM locations over several service routine segments, and updated into the working registers during the same service routine segment.

One idiosyncrasy of an algorithm that may be used with this microprocessor to calculate these values is that the value calculated for long dead time count down period for brightness 0 to FF, due to a roll under from 00. Normally, this would not be a problem, since this value is not used in the brightness level 0 drive routine. However, due to the instruction time limitations in the service routine segments, it is not possible to update the drive routine to be returned to in the same segment as is used to update the values above. Therefore, during brightness level changes, there is one cycle that contains delay values inappropriate for the cycle. If the brightness level change is from level 1 to level 0, this can result in a cycle with a very long dead time, possible causing a noticeable flicker. In other cases of delay value/output loop mismatches, the discontinuity would be minimal and visually unnoticeable (a slight click may occur on brightness level changes). In order to minimize this special case discontinuity, the calculation routine for the dead time delay checks for a result of FF, and if it finds it, corrects it to 01.

At step S25 the program then reverses the output polarity by reversing the output masks to prevent mercury migration. Thus, the output polarity is swapped on alternate trips through the service routine. In some cases, reversing the output polarity at this frequency may cause a visible flickering effect. Therefore, it may be preferable to perform the output polarity switching at a different frequency.

In an alternate configuration, the software may be modified, such as by counting service routine loops, such that the program only performs the output polarity switching on selected passes through the service routine. In effect, step S25 would then be performed after step S33. Such an implementation is discussed herein at step S33. Either frequency of polarity swap may be used, but not both.

Also within the service routine, the watchdog timer is written, to prevent a reset (step S11, FIG. 3C). The watch dog timer (WDT) instruction is the first instruction executed after microcontroller reset, this enables the watch dog timer. It may also be executed during the last segment of the service routine. This is the occurrence that periodically resets the watch dog timer to prevent reset during normal program flow. Essentially, the watch dog timer instruction must be executed periodically, in this case about every 10 milliseconds or less, or the microprocessor IC1 will reset. Preferably, these would be the only two locations of this instruction in the code because watch dog timers are statistically more functional with fewer occurrences of the instruction in a given program. However, in this program the WDT instruction may be executed in two more places. The WDT is executed once in the fault routine, where the 3 second time outs occur, and once in the LED flash routine. The reason is that extensive time is spent in these two routines during fault conditions, thus preventing access to the WDT instruction in the service routine. Accordingly, separate execution may be required to prevent reset here.

Referring again to FIG. 3D, the program then enters the fault checking routine. In the service routing, the 5 fault inputs are checked for false conditions. If no faults are detected, the software flow continues. If a fault is detected, then the values are checked again up to a total of 10 times in the preferred embodiment, in order to clear the fault indication. If the indication can be cleared, then the program flow continues. If not, program flow is vectored to the fault routine. All faults are treated identically at this point in code, although the actual fault is recorded in a register.

The period at step S26 of the fault counter is set to 10, but this may be adjusted in individual application. Subsequently at step S27 within the fault checking routine the program checks to see if a fault condition exists. If the answer is "Yes", then the program proceeds to step S28 and first decrements the debounce counter by one. If in step S29 the debounce counter is equal to 0 and the default conditions still exists, the program proceeds to step S30 and records a fault condition. If the answer is "No", then the program returns to step S27 and again checks for a fault condition. In this way the program will check for a fault condition up to 10 times before recording that a fault condition exists.

If in step S27 the program checks and does not find a fault condition, then the program proceeds to step S31 and increments the service routine counter by one. The program then proceeds to check to see if the service routine counter is overflown at step S32. If the answer is "Yes", then the fault event counter is reset at step S33. Returning to step S30, once the program has recorded a fault condition, the program first turns off both MOSFETS at step S34, increments the fault event counter at step S35, clears the service routine counter at step S36, and finally jumps to a fault routine at step S37.

Figure 3E:
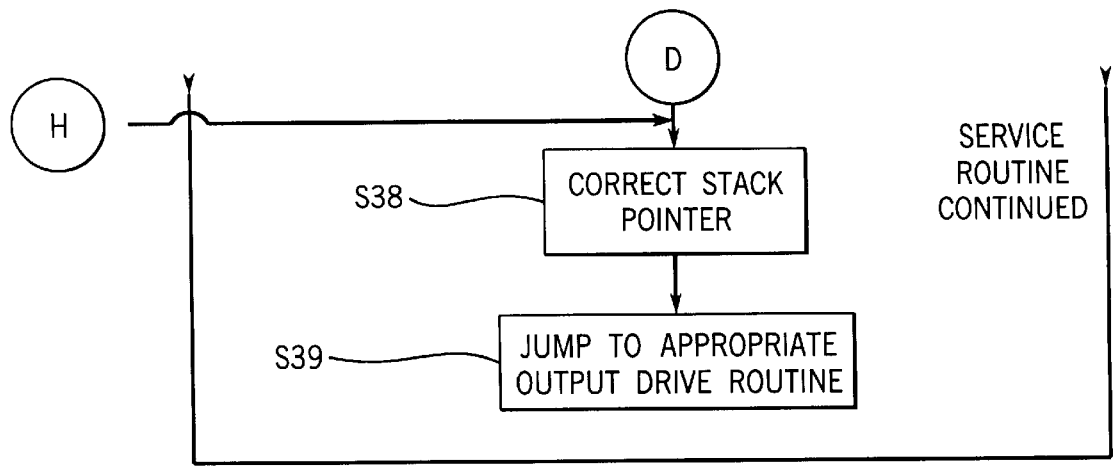
Figure 3E:
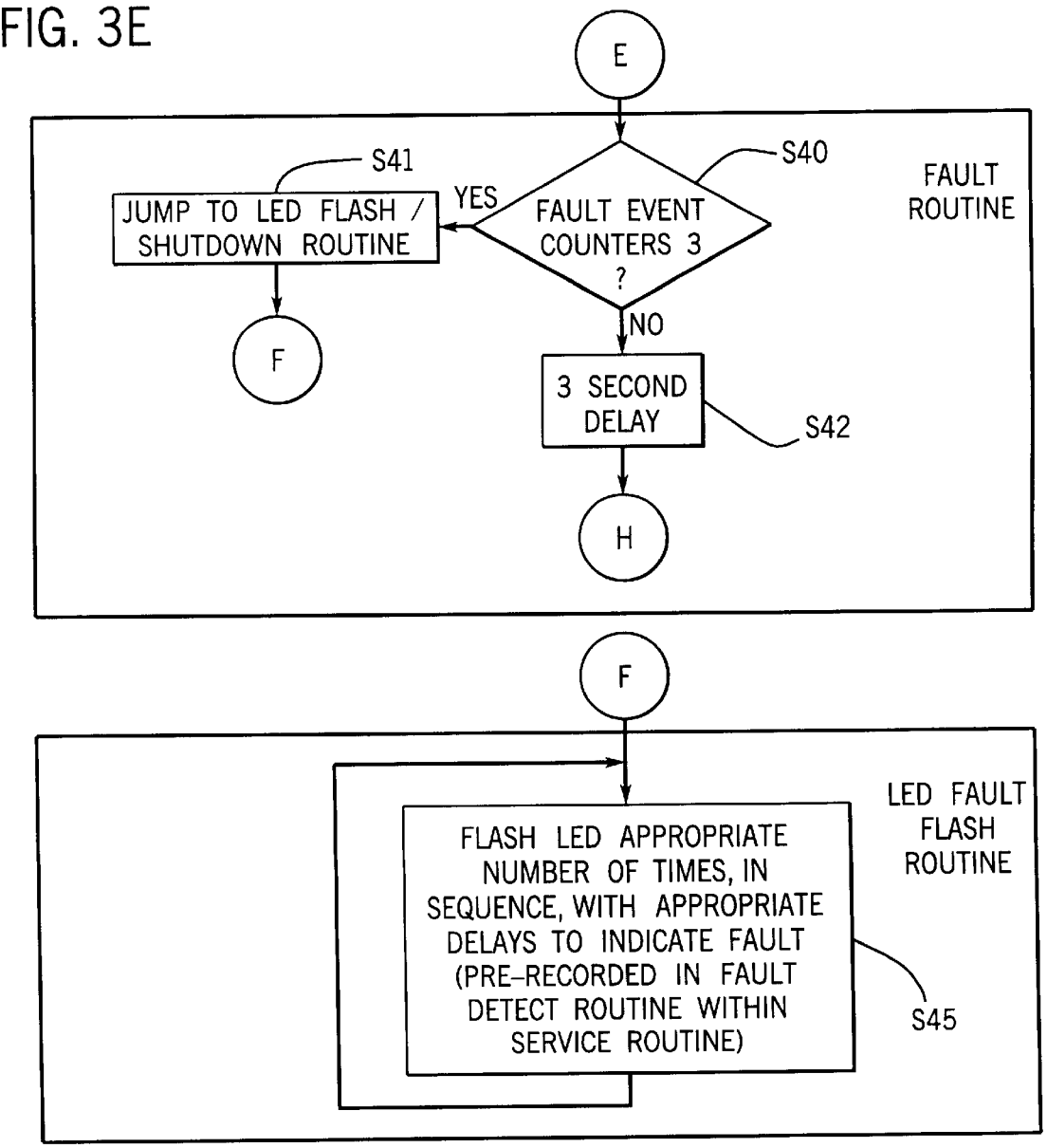

As shown in FIG. 3E, if the program flow is from point D, indicating no fault condition, then the program proceeds to correct the stack pointer at step S38 and then jumps to the appropriate output drive routine at step S39. The last part of the service routine is a jump to the appropriate output drive routine, as determined by the newly established brightness level.

A software counter is incremented each trip through the service routine. When this 16 bit counter overflows, a separate counter which counts the number of successive faults is cleared at step S33. This occurs approximately every 59 seconds. Also, at the overflow of this 16 bit counter at step S33, the output polarity may be swapped to reduce mercury migration. This is accomplished by swapping a pair of output masks (as in step S25), which allows the same output drive routines to be used for either polarity.

The last active part of the service routine is a change to the output drive routine to which program flow will be returned, as determined by the newly established brightness level. Since the service routine is accessed via a call statement, the return statement within the service routine segment normally causes program flow to return to the same output loop from which the call was made. Changes in the output loop are made by modifying the "return to" address contained on the stack prior to executing the return statement.

In order to prevent buzzing, it is important that all accesses to the service routine take exactly the same amount of time. The time for the entire output routine is 50 microseconds. This generates the substantially inaudible 20 kHz output waveform.

For example, in the drive scheme of FIG. 4A, the longest portions of the output cycle are first dead time DT1 and second drive pulse DP2, depending upon the brightness level setting. The program jumps to a service routine segment during either first dead time DT1 or second drive pulse DP2, as shown by steps S55 and S59, respectively, in FIG. 4C.

The long period ON time (second drive pulse DP2) varies from 20 to 32 microseconds, depending upon the brightness level chosen (for brightness levels 0 through 6). Brightness level 6 is the limiting level, which has a 20 microseconds long phase ON time. The service routine segment time must be based on this limiting case. As shown, the time required (in the output loop portion) to turn ON the long side driver, load the delay counter value, call the service routine, and (after the return from the service routine) execute one cycle of the decrement and jump to the beginning of the loop if the counter value is not zero, is 7 microseconds. Within the service routine segment portion, the next address load and the return statement require another 4 microseconds. Together, this code uses 11 microseconds, which leaves 9 microseconds for service routine instructions.

For a call to the service routine during the long dead time DT1, 11 microseconds are available for service instructions. However, since the same segments are used for all brightness levels, the limiting case of 9 microseconds must be used.

Because the AND and OR statements used in the output loops affect the flags, any instructions (primarily compares and conditional jumps) changing and then using the flags within the service routine must be executed within one segment. This requires division of the service routine into appropriate segments. A dead time at the end of a service routine segment may be included to use up left over time. This often occurs when the next instruction affects flags, and therefore, needs to be part of the next segment. Unfortunately, most Z8 instructions are either 6 cycles (1 microsecond at 12 MHz) or 10 cycles (1⅔ microseconds) long, which may result in a sum of instruction times not evenly adding up to 9 microseconds.

One instruction that may be used to generate the needed dead times is the NOP (no operation). However, this instruction takes 1 microseconds, and thus cannot be used to make up fractional microseconds. To make up fractional microseconds, the DA (decimal adjust, 8 cycles, 1⅓ microseconds) and INCW (increment word, 10 cycles, 1⅔ microseconds) may also be used to generate dead times. The latter two of these instructions are preferably implemented on dummy RAM locations, so that they do not affect any important variables. It is important to remember that these two instructions affect the flags, so they must be placed after any flag dependent instructions within the service routine segment. The INCW instruction was chosen for the 10 cycle delay because it, along with DECW (decrement word), are unique among 10 cycle instructions in that they only require 2 bytes of code space (as compared with the 3 bytes normally required).

Some segments of the service routine have conditionally dependent branches, such as checking for an increase or checking for a decrease in brightness level, depending on the state of the hysteresis bit. These segments should be written to ensure that the same 9 microseconds is consumed regardless of the branch that is taken.

However, in some cases excessive time cannot be avoided. Fortunately, these cases are infrequent and so do not produce buzzing. One such example is polarity swapping to prevent mercury migration, which occurs about once per minute. A few extra microseconds are required to swap polarities. This, in combination with the waveform discontinuity that is produced from the swap itself, create a subtle "click" from the core on polarity swap. Another example of a longer than 9 microseconds service segment is a positive fault detection. However, if this occurs, the power supply 10 will likely be shut off regardless, for 3 seconds or permanently, so the core click is irrelevant.

With a single exception, the drive outputs are not controlled during the service routine. During the polarity swap, the outputs are turned OFF to ensure that a return can never turn on both MOSFETs at the same time. It is unlikely that both MOSFETs would be ON, but because the output is being interrupted regardless, there is no disadvantage to such protective measures.

In an alternate embodiment, both the high and low bytes of the address of the next service routine segment to be executed would be loaded into the register pair used for addressing service routine segments. Loading is done at the end of each segment, just prior to the return statement. Unfortunately, in some cases of this particular embodiment, the 9 microseconds available for service routine instructions is just enough to complete the segment, and there is only enough time remaining for one load statement. Therefore, in the illustrated embodiment, only the low byte of the address is loaded into the register pair. The high byte is loaded on program initialization, and is set to 2 H. An ORG (origin) assembler directive is used to fix the location of the start of the service routine code at 200 H. After executing some number of the service routine segments (something over half), the address of the following segments will be located in address space in the 3XXH range. Just prior to the cross over, a special segment loads a 3 H in the high byte of the register pair. The following segments are addressed in the 3XXH code space. The last segment of the service routine loads a 2 H back into the high byte of this register pair, for use when the service routine loops back to the beginning.

Note that this method fixes these code segments at absolute addresses in code space, and therefore, makes them non-relocatable. Therefore, any changes to the program may require careful attention to code location within memory. Any attempt to link this code with other modules may result in errors. This is not necessarily a problem since the code may be complete for this application, and no outside modules are then needed. In another embodiment using a faster microprocessor, it may be preferable to dynamically fix the code address segment.

Fault Processing

If, on the other hand, a fault has been indicated, then the program vectors from point E in FIG. 3D to point E in FIG. 3E within the fault routine. The outputs are turned off for at least three seconds before normal operation may be resumed. If two more faults occur within approximately 6 minutes, the outputs are permanently disabled, and the LED begins to flash a fault code (1, 2, 3, 4 or 5 blinks, depending on the fault: undervoltage, ground continuity fault, overtemperature, ground fault, or overvoltage, respectively).

The fault routine event counter is checked to see if it equals three at step S40. If the answer is "Yes", then the program jumps at step S41 to an LED flash shutdown routine. If the answer is "No", then at step S42 the program performs a three second delay and at point H, jumps to the appropriate output loop to resume operation. The jump from point H in the fault routine is to point H in the service routine, before step S38, as shown in FIG. 3E.

If the program vectors from point F then the program enters the LED fault flash routine, and at step S45 the program will flash the LED an appropriate number of times in sequence with appropriate delays to indicate a particular fault condition.

The LED blink code will be continuously repeated until the power supply 10 is turned off and back on with either the power switch or the power cord. If the power is removed at the power cord to implement a reset, it must be removed for approximately 10 seconds or more to ensure the electrolytic capacitors decay sufficiently to reset the microprocessor. Cycling the power switch gives an immediate reset.

In the case of an over temperature condition, the thermal time constant of the system is longer than 3 seconds. Therefore, an over temperature condition signal will likely cause a system shutdown The LED will flash the fault code for the last fault detected only. If two or three different faults caused the three successive fault indications at the microprocessor, only the last fault will be indicated. If one or two successive faults have occurred, and at least one minute have elapsed since the most recent fault, the fault counter will be reset to give a fresh set of three acceptable faults. This is to prevent nuisance shutdowns from infrequent fault conditions.

End of Code

The Z8 does not begin execution at location 0, rather, it begins at location OCH. The first 12 bytes are reserved for the interrupt vectors. A jump to location OCH has been included in the end of the code space, in the last 3 bytes of the 1K space. Should some unforeseen glitch cause the program to vector to a location past the end of the normal code, the core will continue to execute no operation (NOP) commands until it encounters the jump at the end of the code.

The Z86C08 processor is a drop in replacement for the Z86C04. However, it has 2K rather than 1K of code space. If used, it would be best if the same jump is added at the end of the 2K code space. In doing so, it would not be necessary to remove the jump already present at the end of the 1K code space.

While the several embodiments of the present invention has been shown and described, alternative embodiments will be apparent to those skilled in the art and are within the intended scope of the present invention. Therefore, the invention is to be limited only by the following claims:

I claim:

1. A power supply for a gas discharge lamp, comprising:
   a converter that converts an input AC power signal to at least one DC signal;
   an output transformer, having a primary winding and a secondary winding, the lamp being connected in circuit across said secondary winding;
   a switching network that alternately provides first and second voltage signals across said primary winding, the first and second voltage signals comprising first and second drive pulses, such that there is a first dead time period between said first and second voltage signals, and there is a second dead time period between said second and first voltage signals, said network including
      a first switch that switches the first voltage signal across said primary winding after the second dead time;
      a second switch that switches the second voltage signal across said primary winding after the first dead time; and
   a switch control circuit that controls the switching of said first and second switches to set the brightness level of said lamp by varying the length of at least one of the first and second dead time periods.

2. The power supply of claim 1, further comprising:
   a driver connected in circuit between said switch control circuit and said switching network that controls said switching network in response to said switch control circuit.

3. The power supply of claim 1, wherein said output transformer further comprises:
   a sense winding, in proximity to said secondary winding, that generates a third signal; and
   a feedback circuit that provides a signal functionally related to said third signal to shut down the lamp if said third signal indicates that an overvoltage condition may exist.

4. The power supply of claim 1, wherein each of said first and second switches is a power metal oxide semiconductor field effect transistor (MOSFET).

5. The power supply of claim 1, wherein said switch control circuit includes a controller.

6. The power supply of claim 1, wherein said switch control circuit includes an input device to input a selected lamp brightness level.

7. The power supply of claim 6, wherein said input device comprises a potentiometer.

8. The power supply of claim 6, wherein said input device comprises a binary switch.

9. The power supply of claim 6, wherein said input device is provided in a distinct module that plugs into said switch control circuit.

10. The power supply of claim 9, wherein said input device is configured such that removal of said module causes the power supply to shut down the lamp.

11. The power supply of claim 1, further comprising:
   an averaging circuit for obtaining the average total time of said first and second switches and for generating a DC signal indicative of said average total time; and
   a comparator for comparing said DC signal with a signal output by said input device to determine whether the actual lamp brightness level corresponds to said selected lamp brightness level.

12. The power supply of claim 11, wherein said averaging circuit comprises a low pass filter, and wherein said comparator comprises a controller.

13. The power supply of claim 1, further comprising:
   an output sense circuit that senses the magnitude of a signal functionally related to the lamp output, and that varies the signal magnitude if the sensed magnitude is outside of a predetermined range.

14. The power supply of claim 13, wherein said output sense circuit comprises a current sense circuit.

15. The power supply of claim 13, wherein said output sense circuit comprises a first thyristor and a second thyristor, and wherein said first thyristor senses output above a first selected level, and said second thyristor senses output above a second selected level.

16. The power supply of claim 15, wherein said secondary winding includes a center tap, and wherein said output sense circuit includes first and second resistances across said center tap, and wherein said first thyristor is connected in circuit across said first resistance, and said second thyristor is connected in circuit across said second resistance.

17. The power supply of claim 1, further comprising a temperature sense circuit connected in circuit to said switch control circuit.

18. The power supply of claim 17, wherein said temperature sense circuit includes a temperature sensing device positioned in proximity at least one of the first switch and the second switch.

19. The power supply of claim 17, wherein said temperature sense circuit includes a temperature sensing device positioned in proximity to the gas discharge lamp.

20. The power supply of claim 17, wherein said temperature sense circuit includes a temperature sensing device positioned in proximity to the ambient atmosphere.

21. The power supply of claim 17, wherein said power supply further comprises an input device, and wherein said input device is connected in circuit between said temperature sense circuit and said switch control circuit.

22. The power supply of claim 17, wherein said temperature sense circuit generates a temperature feedback signal when a sensed temperature varies from a selected value, and wherein said temperature feedback signal is communicated to said switch control circuit.

23. The power supply of claim 1, further comprising:
a switch protection circuit that prevents both said first switch and said second switch from conducting at the same time.

24. The power supply of claim 23, wherein said switch protection circuit includes:
a cross conduct inhibit circuit connected in circuit to an output of said switch control circuit.

25. The power supply of claim 1, wherein said switching network provides a signal having a fixed frequency.

26. The power supply of claim 25, wherein said signal frequency is fixed at a value of at least about 19,000 Hertz.

27. The power supply of claim 1, wherein said switch control circuit includes:
means for controlling said switches such that both the first and second dead time periods are changed in response to a brightness control signal.

28. The power supply of claim 27, wherein said switch control circuit includes:
means for controlling said switches such that the first and second dead time periods are equal and such that the first and second dead time periods are both changed in response to a brightness control signal.

29. The power supply of claim 27, wherein said switch control circuit includes:
means for generating a first switch control signal having a first period to control said first switch; and
means for generating a second switch control signal having a second period such that the ratio of said first period to said second period is substantially fixed.

30. The power supply of claim 1, wherein said switch control circuit includes:
means for generating a first switch control signal having a first period to control said first switch; and
means for generating a second switch control signal having a second period that is longer than said first period.

31. The power supply of claim 1, wherein said second dead time period is fixed and shorter than said first dead time period.

32. The power supply of claim 1, wherein said switch control circuit includes:
means for generating a first switch control signal having a first period to control said first switch; and
means for generating a second switch control signal having a second period such that the ratio of said first period to said second period is substantially fixed.

33. The power supply of claim 32, wherein said second dead time period is fixed and shorter than said first dead time period.

34. The power supply of claim 33, wherein said second voltage signal is longer than said first voltage signal.

35. The power supply of claim 33, wherein said first and second periods define a signal frequency, and wherein said signal frequency is a fixed value.

36. The power supply of claim 1, wherein said switch control circuit includes:
means for generating a first switch control signal having a fixed first period to control said first switch; and
means for generating a second switch control signal having a second period that is shorter than said first fixed period.

37. The power supply of claim 20, wherein said switch control circuit includes:
means for controlling said switches such that second dead time period is fixed.

38. The power supply of claim 21, wherein said second dead time period is shorter than said first dead time period.

39. The power supply of claim 1, wherein said switch control circuit further comprises:
means for varying the ratio of the times of said first and second switches in response to a brightness control signal.

40. The power supply of claim 1, wherein said switch control circuit further comprises:
means for generating a first switch control signal having a first frequency that is varied in response to a brightness control signal; and
means for generating a second switch control signal having said first frequency that is varied in response to the brightness control signal.

41. The power supply of claim 40, wherein said first frequency is at least about 19,000 Hertz.

42. A method of changing the brightness level of a lamp, said lamp being connected between a first terminal and a second terminal, comprising:
providing a first switch that is in circuit connection with a source of a first voltage;
providing a second switch that is in circuit connection with a source of a second voltage;
activating said first switch for a first period to thereby apply a first voltage signal across the first and second terminals, the first voltage signal comprising a first drive pulse;
deactivating said first switch for a first dead time period;
activating said second switch for a second period after said first dead time period has expired to thereby apply a second voltage signal across the first and second terminals, the second voltage signal comprising a second drive pulse;
deactivating said second switch for a second dead time period; and
varying at least one of said first dead time period and said second dead time period in response to a brightness control signal.

43. The method of claim 42, wherein said second switch deactivating step comprises:
deactivating said second switch for a second dead time that is equal to said first dead time period; and wherein said varying step includes
varying both said first dead time period and said second dead time period in response to the brightness control signal.

44. The method of claim 43, wherein said first and second switch activating steps includes
activating at least one of said first switch and said second switch for a variable period.

45. The method of claim 42, wherein said first switch activating step and said second switch activating step activate said first and second switches respectively such that the ratio of said first period and said second period remains substantially constant.

46. The method of claim 42, wherein said second switch deactivating step includes:
deactivating said second switch for a fixed second dead time.

47. The method of claim 46, wherein said first switch activation step includes activating said first switch for a first period, and said second switch activation step includes activating said second switch for a second period longer than said first period.

48. The method of claim 46, wherein said first switch deactivating step includes deactivating said first switch for a first dead time longer than said second dead time.

49. The method of claim 46, wherein said second switch activation step includes activating said second switch for a second period longer than said first period.

50. The method of claim 42, wherein said first switch activating step includes:
   activating said first switch for a fixed first period.

51. The method of claim 50, wherein said second switch deactivation step includes:
   deactivating said second switch for a fixed second dead time.

52. The method of claim 50, wherein said second switch activating step includes:
   activating said second switch for a variable second time period.

53. The method of claim 50, wherein said second switch activating step includes:
   activating said second switch for a second period that is shorter than said fixed first period.

54. The method of claim 42, further comprising:
   varying the frequency of the first switch activating step and varying the frequency of the second switch activating step in response to the brightness control signal.

55. The method of claim 42, further comprising:
   sensing at least one of the ambient temperature and a temperature functionally related to a temperature near the lamp, and varying at least one of the drive pulse and the dead time in response to the sensed temperature.

56. A method of changing the brightness level of a lamp that is connected between a first terminal and a second terminal, comprising:
   providing a first switch that is in circuit connection with a source of a first voltage:
   providing a second switch that is in circuit connection with a source of a second voltage;
   activating said first switch for a first period to thereby apply a voltage signal of a first magnitude across said first and second terminals, the first voltage signal comprising a first drive pulse;
   deactivating said first switch for a substantially fixed first dead time period;
   activating said second switch for a second period to thereby apply a voltage signal of a second magnitude across said first and second terminals, the second voltage signal comprising a second drive pulse, after said first dead time period has expired;
   deactivating said second switch for a substantially fixed second dead time period; and
   varying the ratio of said first period and said second period in response to a brightness control signal.

57. The method of claim 56, wherein said first switch activating step includes activating said first and second switches at a substantially fixed frequency.

58. A ground fault interrupt circuit for a gas discharge lamp power supply, the power supply including an output transformer having a secondary winding having a center tap and connected in circuit across first and second terminals of the gas discharge lamp, said ground fault interrupt circuit comprising:
   an avalanche device connected in circuit to the center tap of the secondary winding; and
   a resistance device connected in circuit between the center tap of the secondary winding and a ground line.

59. The ground fault interrupt circuit of claim 58, wherein said ground line comprises a utility ground line.

60. The ground fault interrupt circuit of claim 58, wherein said ground line comprises a ground network.

61. The ground fault interrupt circuit of claim 58, wherein said avalanche device comprises a thyristor.

62. The ground fault interrupt circuit of claim 58, wherein said avalanche device comprises a triac.

63. The ground fault interrupt circuit of claim 58, wherein said avalanche device comprises a silicon controlled rectifier (SCR).

64. The ground fault interrupt circuit of claim 58, wherein said avalanche device comprises a diac.

65. The ground fault interrupt circuit of claim 58, wherein said avalanche device includes a control gate, and wherein said resistance device is connected in circuit between the center tap of the secondary winding and said control gate.

66. The ground fault interrupt circuit of claim 65, wherein said avalanche device is selected from the group consisting of a silicon controlled rectifier and a triac.

67. The ground fault interrupt circuit of claim 58, wherein said circuit further comprises second and third oppositely biased avalanche devices connected in series, said second and third oppositely biased avalanche devices being connected in circuit between the center tap of the secondary winding and said first avalanche device.

68. The ground fault interrupt circuit of claim 67, wherein said oppositely biased avalanche devices comprise zener diodes.

69. The ground fault interrupt circuit of claim 58, wherein said resistance device and said avalanche device each have respective normal failure modes, and wherein said sensor is configured such that failure of said resistance device or said avalanche device according to the respective normal failure mode of the failed device causes the activation of the ground fault interrupt circuit.

70. The ground fault interrupt circuit of claim 58, wherein said avalanche device is configured such that said avalanche device does not latch into a conducting state.

71. A ground continuity detector for a gas discharge lamp power supply that detects a discontinuity between a utility ground line of a power source and the power supply, said ground continuity detector comprising:
   a circuit ground line having a voltage that is substantially constant and substantially different in magnitude from the utility ground line;
   a chassis ground line connected in circuit to the utility ground line; and
   a ground continuity sensor connected in circuit between said circuit ground line and said chassis ground line, said ground continuity sensor being capable of generating a ground continuity fault signal when the voltage between said circuit ground line and said chassis ground line varies from a predetermined value.

72. The ground continuity detector of claim 71, wherein said chassis ground line is directly connected in circuit to the utility ground line, such that there is substantially no voltage between said chassis ground line and the utility ground line.

73. The ground continuity detector of claim 71, wherein said ground continuity sensor is capable of generating a ground continuity fault signal when the magnitude of the voltage between said circuit ground line and said chassis ground line falls below a voltage trip setpoint.

74. The ground continuity detector of claim 73, wherein said sensor is configured such that the voltage trip setpoint is over about 20 volts.

75. The ground continuity detector of claim 71, wherein said substantially constant voltage between said circuit ground line and the utility ground line is at least about 100 volts.

76. The ground continuity detector of claim 71, wherein said circuit ground line has a substantially constant voltage about 170 volts below said utility ground line.

77. The ground continuity detector of claim 71, further comprising:
   a first resistance device connected in circuit between said circuit ground line and a node;
   a second resistance device connected in circuit between said chassis ground line and said node;
   wherein said ground continuity sensor is connected in circuit to said node to detect the voltage of said node.

78. The ground continuity detector of claim 77, wherein said second resistance device comprises a pair of resistors in parallel.

79. The ground continuity detector of claim 71, wherein said ground continuity sensor comprises a controller to control the power supply.

80. A dimming module that may be used with a power supply for a gas discharge lamp, comprising:
   an input device, comprising a binary switch, that is used to set the brightness level of the gas discharge lamp and that includes a circuit that communicates to the power supply when the dimming module is connected to the power supply; and
   a connector that connects said dimming module in circuit to the power supply.

81. A dimming module that may be used with a power supply for a gas discharge lamp, comprising:
   an input device that is used to set the brightness level of the gas discharge lamp and that includes a circuit that communicates to the power supply when the dimming module is connected to the power supply, said input device including a feedback circuit that generates a signal functionally related to the output of the gas discharge lamp; and
   a connector that connects said dimming module in circuit to the power supply.

82. A dimming module that may be used with a power supply for a gas discharge lamp, comprising:
   an input device that is used to set the brightness level of the gas discharge lamp and that includes a circuit that communicates to the power supply when the dimming module is connected to the power supply; and
   a connector that connects said dimming module in circuit to the power supply;
   wherein said input device includes an RC filter connected in circuit to said connector.

83. A power supply for a gas discharge lamp, comprising:
   a converter that converts an input AC power signal to at least one DC signal;
   an output transformer, having a primary winding and a secondary winding, the lamp being connected in circuit across said secondary winding;
   a switching network that alternately provides first and second drive pulse across said primary winding, such that there is a first dead time period between said first and second drive pulses, and there is a second dead time period between said second drive pulse and a first drive pulse of a next switching cycle; said network including
   a first switch that switches the first drive pulse across said primary winding after the second dead time;
   a second switch that switches the second drive pulse across said primary winding after the first dead time; and
   a switch control circuit that controls the switching of said first and second switches to change the brightness level of said lamp by varying the length of both of said first and second drive pulses while maintaining a fixed ratio other than 1 to 1 of said first drive pulse to said second drive pulse.

84. A power supply for a gas discharge lamp, comprising:
   a converter that converts an input AC power signal to at least one DC signal;
   an output transformer, having a primary winding and a secondary winding, the lamp being connected in circuit across said secondary winding;
   a switching network that alternately provides first and second drive pulses across said primary winding, such that there is a first dead time period between said first and second drive pulses, and there is a second dead time period between said second drive pulse and the first drive pulse of the next switching cycle, said network including
   a first switch that switches the first drive pulse across said primary winding after the second dead time;
   a second switch that switches the second drive pulse across said primary winding after the first dead time; and
   a switch control circuit that controls the switching of said first and second switches to change the brightness level of said lamp from a first brightness level to a second brightness level by varying the length of one of the first and second dead time periods while maintaining the other of said dead time periods fixed.

85. The power supply of claims 83 or 84, wherein said fixed ratio of said first drive pulse to said second drive pulse is 1 to 2.

86. The power supply of claims 83 or 84, wherein said switch control circuit includes a controller.

87. The power supply of claims 83 or 84, wherein said switch control circuit includes an input device to input a selected lamp brightness level.

88. The power supply of claim 87, wherein said input device comprises a potentiometer.

89. The power supply of claim 87, wherein said input device comprises a binary switch.

90. The power supply of claim 87, wherein said input device is provided in a distinct module that plugs into said switch control circuit.

91. The power supply of claim 90, wherein said input device is configured such that removal of said module causes the power supply to shut down the lamp.

92. The power supply of claim 83, wherein said switch control circuit includes:
   means for controlling said switches such that both the first and second dead time periods are changed in response to a brightness control signal.

93. The power supply of claim 83, wherein said switch control circuit includes:
   means for controlling said switches such that the first and second dead time periods are equal and such that the first and second dead time periods are both changed in response to a brightness control signal.

94. The power supply of claims 83 or 84, wherein said second drive pulse is longer than said first drive pulse; and wherein said second dead time period is fixed and shorter than said first dead time period.

95. The power supply of claims 83 or 84, wherein the ratio of said first drive pulse to said second drive pulse remains fixed at all brightness levels.

96. The power supply of claim 95, wherein said ratio is 1 to 2.

97. A method of changing the brightness level of a lamp, said lamp being connected between a first terminal and a second terminal, comprising:

providing a first switch that is in circuit connection with a voltage source;

providing a second switch that is in circuit connection with said voltage source;

activating said first switch for a first period to thereby apply a first drive pulse across the first and second terminals;

deactivating said first switch for a first dead time period;

activating said second switch for a second period after said first dead time period to thereby apply a second drive pulse across the first and second terminals;

deactivating said second switch for a second dead time period; and varying exactly one of said first dead time period and said second dead time period in response to a brightness control signal.

98. A method of changing the brightness level of a lamp, said lamp being connected between a first terminal and a second terminal, comprising:

providing a first switch that is in circuit connection with a voltage source;

providing a second switch that is in circuit connection with said voltage source;

activating said first switch for a first period to thereby apply a first drive pulse across the first and second terminals;

deactivating said first switch for a first dead time period;

activating said second switch for a second period after said first dead time period to thereby apply a second drive pulse across the first and second terminals;

deactivating said second switch for a second dead time period; and varying both said first period and said second period in response to a brightness control signal while maintaining a fixed ratio between said first period and said second period, wherein said varying step includes varying exactly one of said first dead time period and said second dead time period in response to the brightness control signal.

99. The method of claim 98, wherein said second switch deactivating step includes:

deactivating said second switch for a fixed second dead time.

100. The method of claim 99, wherein said first switch activation step includes activating said first switch for a first period, and said second switch activation step includes activating said second switch for a second period longer than said first period.

101. The method of claim 98, wherein said first switch deactivating step includes deactivating said first switch for a first dead time longer than said second dead time.

102. The method of claim 98, wherein said second switch activation step includes activating said second switch for a second period longer than said first period.

103. The method of claim 98, further comprising:

varying the frequency of the first switch activating step and varying the frequency of the second switch activating step in response to the brightness control signal.

104. A dimming module used with a microprocessor-controlled power supply for a gas discharge lamp, comprising:

an input device that is used to set the brightness level of the gas discharge lamp and that includes a circuit that communicates to the power supply when the dimming module is connected to the power supply, said input device providing an analog signal in response to which said microprocessor controls the brightness of said lamp; and a connector that connects said dimming module in circuit to the power supply.

105. The dimming module of claim 104, wherein said input device comprises a potentiometer.

106. The dimming module of claim 104, wherein said input device comprises a binary switch.

107. The dimming module of claim 104, wherein said input device comprises a fixed resistance.

108. The dimming module of claim 104, wherein said input device comprises a feedback circuit that generates a signal functionally related to the output of the gas discharge lamp.

109. The dimming module of claim 104, wherein said input device includes a signal modulator.

110. The dimming module of claim 104, wherein said input device includes a timer.

111. The dimming module of claim 110, wherein said timer includes an RC network.

112. The dimming module of claim 104, wherein said input device includes an RC filter connected in circuit to said connector.

113. A method of dimming a gas discharge lamp comprising the steps of:

providing an input device that is used to vary the brightness level of a gas discharge lamp;

providing a power supply that has set the gas discharge lamp to a predetermined brightness level;

connecting the input device to the power supply;

setting the input device to a selected level to generate a brightness signal and to vary the brightness of the lamp; and removing the input device and thereby shutting down the lamp.

* * * * *